United States Patent
Wang et al.

(10) Patent No.: US 12,223,618 B2
(45) Date of Patent: Feb. 11, 2025

(54) TARGETED SUPER-RESOLUTION IMAGE PROCESSING METHOD AND APPARATUS, AND ELECTRONIC DEVICE

(71) Applicant: HUAWEI TECHNOLOGIES CO., LTD., Shenzhen (CN)

(72) Inventors: Hengming Wang, Hangzhou (CN); Yang Wang, Hangzhou (CN); Jie Ji, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 402 days.

(21) Appl. No.: 17/726,218

(22) Filed: Apr. 21, 2022

(65) Prior Publication Data

US 2022/0245765 A1 Aug. 4, 2022

Related U.S. Application Data

(63) Continuation of application No. PCT/CN2020/110029, filed on Aug. 19, 2020.

(30) Foreign Application Priority Data

Oct. 22, 2019 (CN) .......................... 201911008119.2

(51) Int. Cl.
*G06T 3/4053* (2024.01)
*H04N 5/232* (2006.01)
(Continued)

(52) U.S. Cl.
CPC ......... *G06T 3/4053* (2013.01); *H04N 19/176* (2014.11); *H04N 23/951* (2023.01)

(58) Field of Classification Search
None
See application file for complete search history.

(56) References Cited

U.S. PATENT DOCUMENTS

| 10,701,394 | B1 * | 6/2020 | Caballero | .............. G06N 3/045 |
| 2008/0267532 | A1 * | 10/2008 | Matsumoto | ........... G06T 3/4053 |
| | | | | 382/298 |
| 2010/0183245 | A1 * | 7/2010 | Oryoji | .................... H04N 7/014 |
| | | | | 382/299 |

FOREIGN PATENT DOCUMENTS

| CN | 101017573 A | 8/2007 |
| CN | 104966269 A | 10/2015 |

(Continued)

OTHER PUBLICATIONS

English translation of JP-2015039049-A. (Year: 2015).*
(Continued)

*Primary Examiner* — Thomas D Lee
(74) *Attorney, Agent, or Firm* — Rimon PC

(57) ABSTRACT

The present application discloses an image processing method and apparatus, and an electronic device, and pertains to the field of image processing. The method includes: obtaining an inter-frame residual between two adjacent image frames to obtain a residual block; determining, based on the residual block, a target pixel region on which super-resolution processing needs to be performed; and performing super-resolution processing on the target pixel region to obtain a target pixel region. For another pixel region, the super-resolution processing result of an image frame that is in the two image frames and on which super-resolution processing is performed is used. This application reduces high computation costs of super-resolution processing.

20 Claims, 11 Drawing Sheets

(51) Int. Cl.
    *H04N 19/176*    (2014.01)
    *H04N 23/951*    (2023.01)

(56) References Cited

FOREIGN PATENT DOCUMENTS

| CN | 107093170 | A |   | 8/2017 |
|----|-----------|---|---|--------|
| CN | 109272447 | A |   | 1/2019 |
| CN | 109951666 | A |   | 6/2019 |
| CN | 110009650 | A |   | 7/2019 |
| CN | 111784570 | A | * | 10/2020 |
| JP | 2013222432 | A |   | 10/2013 |
| JP | 2015039049 | A | * | 2/2015 |

OTHER PUBLICATIONS

English translation of CN-111784570-A. (Year: 2020).*

Zhang Zhengdong et al: "FAST: A Framework to AccelerateSuper-Resolution Processing on Compressed Videos." 2017 IEEE Conference on Computer Vision and Pattern Recognition Workshops. (CVPRW), IEEE, Jul. 21, 2017 (Jul. 21, 2017), pp. 1015-1024, XP033145880, DOI:10.1109/CVPRW.2017.138. [retrieved on Aug. 22, 2017]; 10 total pages.

* cited by examiner

| 128 | 128 | 128 | 128 | 129 |
|-----|-----|-----|-----|-----|
| 128 | 128 | 130 | 128 | 128 |
| 128 | 128 | 128 | 128 | 128 |
| 127 | 128 | 128 | 128 | 128 |
| 133 | 20  | 21  | 20  | 20  |

FIG. 3

| 128 | 128 | 128 | 128 | 129 |
|-----|-----|-----|-----|-----|
| 128 | 128 | 0   | 128 | 128 |
| 128 | 128 | 128 | 128 | 128 |
| 127 | 128 | 128 | 128 | 128 |
| 0   | 0   | 0   | 0   | 0   |

FIG. 4

TARGETED SUPER-RESOLUTION IMAGE PROCESSING METHOD AND APPARATUS, AND ELECTRONIC DEVICE

CROSS-REFERENCE TO RELATED APPLICATIONS

This application is a continuation of International Application No. PCT/CN2020/110029, filed on Aug. 19, 2020, which claims priority to Chinese Patent Application No. 201911008119.2, filed on Oct. 22, 2019. The disclosures of the aforementioned applications are hereby incorporated by reference in their entireties.

TECHNICAL FIELD

The present application generally relates to the field of image processing, and in particular, to an image processing method and apparatus, and an electronic device.

BACKGROUND

With developments in science and technology, super-resolution (e.g., super resolution) display apparatuses, such as smart televisions, are becoming increasingly widely used. A super-resolution display apparatus is a display apparatus that can perform super-resolution processing on an image. Super-resolution processing is a technology for reconstructing a low-resolution image into a high-resolution image.

Currently, a super-resolution display apparatus may input a decoded image into a super-resolution model, and then performs super-resolution processing on the image by using the super-resolution model. However, in such an image processing method, a computation amount of the super-resolution processing is relatively large, and computation costs are relatively high.

SUMMARY

Embodiments of this application provide an image processing method and apparatus, and an electronic device, to reduce a computation amount of current super-resolution processing and reduce computation costs. The following describes this application from different aspects. It should be understood that mutual reference may be made to implementations and beneficial effects of the following different aspects.

"First" and "second" appearing in this application are merely intended to distinguish between two objects, and do not indicate a sequence.

An embodiment of this application provides an image processing method. The method includes: obtaining an inter-frame residual between a first image and a previous image frame adjacent to the first image to obtain a residual block, where the residual block includes a plurality of residual points that are in a one-to-one correspondence with locations of a plurality of pixels in the first image, and each residual point has one residual value; determining a (first) target pixel region in the first image based on the residual block; performing super-resolution processing on the target pixel region in the first image to obtain a (e.g., second) target pixel region after the super-resolution processing; and updating another (e.g., a first) pixel region in the first image by using another (e.g., a second) pixel region that is in the previous image frame and that is obtained after super-resolution processing, where the another pixel region includes a pixel region in the first image other than the target pixel region. In this way, an effect that is the same as that of performing super-resolution processing on the another pixel region is achieved without a need to perform super-resolution processing on the another pixel region.

A first image obtained after super-resolution processing includes the target pixel region obtained after the super-resolution processing and updated another pixel region (which is equivalent to another pixel region obtained after super-resolution processing).

In some embodiments of this application, the target pixel region in the first image is determined, and the super-resolution processing is performed on the target pixel region, to implement super-resolution processing on a region in which a pixel that is in the first image and that is different from a pixel in the previous image frame is located. In addition, the another pixel region in the first image is updated by using the another pixel region that is in the previous image frame and that is obtained after the super-resolution processing. This achieves the effect that is the same as that of performing super-resolution processing on the another pixel region, and fully utilizes a characteristic of time-domain redundancy of a video. Therefore, an effect of performing full super-resolution processing on the first image is achieved by performing super-resolution processing on a partial region in the first image, to reduce a computation amount of super-resolution processing and reduce computation costs.

Because the another pixel region includes the pixel region in the first image other than the target pixel region, a size of the target pixel region may or may not match a size of the another pixel region. Correspondingly, manners of obtaining the first image after the super-resolution processing are also different. In some embodiments of this application, the following two examples are used as examples for description:

In an example, the size of the target pixel region matches the size of the another pixel region, in other words, the another pixel region is the pixel region in the first image other than the target pixel region. Correspondingly, a size of the target pixel region obtained after the super-resolution processing also matches a size of the updated another pixel region. In this case, the first image obtained after super-resolution processing may be obtained by splicing the target pixel region obtained after the super-resolution processing and the updated another pixel region.

In another example, the size of the target pixel region does not match the size of the another pixel region, and there is an overlapping region between edges of the target pixel region and the another pixel region. In other words, the another pixel region includes another pixel region in addition to the pixel region in the first image other than the target pixel region. Correspondingly, a size of the target pixel region obtained after the super-resolution processing does not match a size of the updated another pixel region either, and there is an overlapping region between edges of the target pixel region obtained after the super-resolution processing and the updated another pixel region. The another pixel region in the first image is obtained by performing an update by using another pixel region that is in a second image and that is obtained after super-resolution processing. This results in pixel data of a pixel included in the another pixel region in the first image to usually be more accurate. Therefore, data of a pixel in the overlapping region in the first image obtained after super-resolution processing is usually based on data of a pixel in the updated another pixel region in the first image. In this case, the first image obtained after super-resolution processing may be obtained by splicing an updated target pixel region and the updated another pixel region. The updated target pixel region is obtained by subtracting (also referred to as removing), from the target pixel region obtained after the super-resolution processing, the overlapping region between the target pixel region obtained after the super-resolution processing and the another pixel region. The updated target pixel region shrinks inward relative to the target pixel region before updating, and a size of the updated target pixel region matches a size of the updated another pixel region.

Optionally, the target pixel region includes a region that is in the first image and in which a pixel corresponding to a location of a first target residual point is located, and the first target residual point is a point that is in the residual block and whose residual value is greater than a specified threshold. Optionally, the specified threshold may be 0.

For example, the target pixel region is a region that is in the first image and in which pixels corresponding to locations of the first target residual point and a second target residual point are located, and the second target residual point is a residual point that is in the residual block and that is around the first target residual point. A residual point around the first target residual point is a residual point arranged around the first target residual point, and is a peripheral point that is of the first target residual point and that satisfies a specified condition. For example, the residual point around the first target residual point is a residual point above, below, on the left of, or on the right of the first target residual point, or is a residual point above, below, on the left of, on the right of, on the upper left of, on the lower left of, on the upper right of, or on the lower right of the first target residual point. The specified condition is determined based on a super-resolution processing requirement. For example, the specified condition is set based on a receptive field (for example, a receptive field of the last convolutional layer) in a super-resolution model.

For example, the second target residual point is a residual point that is in the residual block and around the first target residual point and whose residual value is not greater than the specified threshold. In other words, the second target residual point is a point whose residual value is not greater than the specified threshold and that is in a peripheral point that is of the first target residual point and that satisfies the specified condition.

When residual values of all residual points in the residual block are 0, it indicates that content of the first image and the previous image frame are the same, and the first image and the previous image frame obtained after super-resolution processing should also be the same. Therefore, the first image may be updated by using the previous image frame obtained after super-resolution processing, to achieve an effect that is the same as that of performing super-resolution processing on the first image. In this case, super-resolution processing does not need to be performed on the first image, in other words, an operation of determining the target pixel region does not need to be performed. In this way, computation costs can be effectively reduced. Correspondingly, the determining a target pixel region in the first image based on the residual block may include when a residual value of at least one residual point included in the residual block is not 0, determining the target pixel region in the first image based on the residual block. In other words, when the residual block includes a residual point whose residual value is not 0, the operation of determining the target pixel region is performed.

In some implementations, the determining a target pixel region in the first image based on the residual block includes: generating a mask pattern based on the residual block, where the mask pattern includes a plurality of first mask points, and the plurality of first mask points are in a one-to-one correspondence with locations of a plurality of target residual points in the residual block; and inputting the mask pattern and the first image into a super-resolution model, and determining, as the target pixel region by using the super-resolution model, a region that is in the first image and in which pixels corresponding to locations of all of the plurality of first mask points are located.

Correspondingly, the performing super-resolution processing on a target pixel in the first image to obtain a target pixel after the super-resolution processing includes: performing super-resolution processing on the target pixel region in the first image by using the super-resolution model, to obtain the target pixel region after the super-resolution processing.

In some other implementations, the determining a target pixel region in the first image based on the residual block includes: generating a mask pattern based on the residual block, where the mask pattern includes a plurality of first mask points, and the plurality of first mask points are in a one-to-one correspondence with locations of a plurality of target residual points in the residual block; and determining, as the target pixel region, a region that is in the first image and in which pixels corresponding to locations of all of the plurality of first mask points are located.

Correspondingly, the performing super-resolution processing on a target pixel in the first image to obtain a target pixel after the super-resolution processing includes: inputting the target pixel in the first image into a super-resolution model, and performing super-resolution processing on the target pixel region in the first image by using the super-resolution model, to obtain the target pixel region after the super-resolution processing.

In some implementations, the generating a mask pattern based on the residual block includes: generating, based on the residual block, an initial mask pattern including a plurality of mask points, where the plurality of mask points are in a one-to-one correspondence with locations of the plurality of pixels in the first image, and the plurality of mask points include the plurality of first mask points and a plurality of second mask points; and assigning a first value to a mask value of the first mask point in the initial mask pattern, and assigning a second value to a mask value of the second mask point in the mask pattern, to obtain the mask pattern, where the first value is different from the second value; and the determining, as the target pixel region, pixels that are in the first image and that correspond to locations of the plurality of first mask points includes: traversing mask points in the mask pattern, and determining, in the first image, a pixel corresponding to a mask point whose mask value is the first value as the target pixel region.

In some implementations, the generating a mask pattern based on the residual block includes: performing morphological transformation processing on the residual block to obtain the mask pattern, where the morphological transformation processing includes binarization processing and dilation processing that is performed on a first mask point in a residual block obtained after the binarization. For example, the binarization processing and the dilation processing may be successively performed.

The binarization processing is a processing manner in which a pixel value of each pixel in an image is set to one of two pixel values: a first value and a second value. The first value is different from the second value. After the binarization processing, the image includes only pixels corresponding to the two pixel values. The binarization processing can reduce interference of various elements in the image to a subsequent image processing process.

Any method of a global binarization threshold method, a local binarization threshold method, a maximum between-cluster variance method, and an iterative binarization threshold method may be used for the binarization processing in some embodiments of this application. This is not limited in this embodiment of this application.

The dilation processing is a type of processing for obtaining a local maximum value. Convolution is performed on a to-be-processed image and a preset kernel (also referred to as a kernel). In each convolution process, a maximum value in a kernel coverage area is assigned to a specified pixel, so that a bright pixel is brighter. An achieved effect is that a bright region of the to-be-processed image is dilated. The kernel has a definable anchor point, the anchor point is usually a central point of the kernel, and the specified pixel is the anchor point.

In some embodiments of this application, the super-resolution model includes at least one convolution kernel, and a kernel for the dilation processing has a same size as a receptive field of the last convolutional layer of the super-resolution model. The last convolutional layer is an output layer of the super-resolution model, an image obtained through super-resolution processing by using the super-resolution model is output from this layer, and the receptive field of the layer is a largest receptive field among receptive fields corresponding to all convolutional layers in the super-resolution model. A size of a mask pattern obtained in this way matches a size of the largest receptive field of the super-resolution model. This implements a good guiding function, avoids a case in which an image subsequently input into the super-resolution model cannot be convolved by the convolutional layer because a region that is in the image and on which convolution can be performed is excessively small, and ensures that super-resolution processing can be effectively performed on the image subsequently input into the super-resolution model. For example, the size of the kernel may be 3×3 pixels or 5×5 pixels.

In some implementations, the generating of the mask pattern based on the residual block includes: dividing the residual block into a plurality of residual sub-blocks, and performing block division processing on each residual sub-block obtained through the division, where the block division processing includes: when a residual value of at least one residual point included in the residual sub-block is not 0, dividing the residual sub-block into a plurality of residual sub-blocks, and performing block division processing on each residual sub-block obtained through the division, until residual values of all residual points included in a residual sub-block obtained through the division are 0, a total quantity of residual points in a residual sub-block obtained through the division is less than a point quantity threshold, or a total quantity of times for dividing the residual block reaches a quantity of times threshold; and generating a mask sub-pattern corresponding to each target residual block, where a residual value of at least one residual point included in the target residual block is not 0, and the mask pattern includes the generated mask sub-pattern.

In some implementations, the performing super-resolution processing on a target pixel in the first image to obtain a target pixel after the super-resolution processing includes: obtaining, from the first image, a target image block corresponding to each mask sub-pattern; and performing super-resolution processing on a sub-region that is of the target pixel region and that is included in each target image block, to obtain the target pixel region after the super-resolution processing, where the target pixel region obtained after the super-resolution processing includes sub-regions of the target pixel region that are included in all the target image blocks and that are obtained after the super-resolution processing.

In some embodiments of this application, a plurality of target image blocks may be selected from the first image to perform super-resolution processing on each target image block. Because super-resolution processing is performed on the target image blocks, and a size of each target image block is smaller than that of the first image, computation complexity of super-resolution processing can be reduced, and computation costs can be reduced. Especially when super-resolution processing is performed by using the super-resolution model, complexity of the super-resolution model can be effectively reduced, and efficiency of super-resolution computation can be improved.

In some implementations, the dividing the residual block into a plurality of residual sub-blocks includes: dividing the residual block into the plurality of residual sub-blocks in a quadtree division manner; and the dividing the residual sub-block into a plurality of residual sub-blocks includes: dividing the residual sub-block into the plurality of residual sub-blocks in the quadtree division manner.

In a conventional video decoding process, block division may need to be performed on an image, and block division is usually performed in a quadtree division manner. Therefore, in some embodiments of this application, when block division is performed on the residual block and the residual sub-block in the quadtree division manner, a conventional image processing method may be used. For example, in actual application, an image division module used in the foregoing video decoding process may alternatively be used to divide the residual block and the residual sub-block, to reuse the module and reduce computation costs. In addition, when the quadtree division manner is used, during each division, the residual block or the residual sub-block may be divided into four residual sub-blocks with an equal size, so that residual blocks obtained through the division have a uniform size, facilitating subsequent processing.

In some implementations, before the updating another pixel region in the first image by using another pixel region that is in the previous image frame and that is obtained after super-resolution processing, the method further includes: performing erosion processing on the plurality of first mask points in the mask pattern to obtain an updated mask pattern, where a kernel for the erosion processing has a same size as the receptive field of the last convolutional layer of the super-resolution model; determining, as auxiliary pixels, pixels that are in the first image and that correspond to locations of a plurality of first mask points obtained after the erosion processing; and determining, as the another pixel region, a region that is in the first image and in which a pixel other than the auxiliary pixels is located.

Marginal noise of the image can be eliminated through the erosion processing. The another pixel region is determined by using the updated mask pattern obtained through the erosion processing. Compared with the another pixel region obtained in the foregoing first manners and the another pixel region obtained in the foregoing second optional manners, the another pixel region has a clearer edge, and smaller noise is generated. When a pixel updating process is subsequently performed, negative effects such as detail blurring, edge passivation, granular sensation, and noise enhancement can be reduced, thereby ensuring a display effect of a final reconstructed first image.

In some implementations, before the determining a target pixel region in the first image, the determining a target pixel region in the first image based on the residual block includes: calculating a first proportion of a quantity of residual points that are in the residual block and whose residual values are 0 in a total quantity of residual points in the residual block; and when the first proportion is greater than a first super-resolution trigger proportion threshold, determining the target pixel region in the first image based on the residual block.

In this way, whether to execute a partial super-resolution algorithm may be determined based on a content difference between the first image and the previous image frame, to improve image processing flexibility.

In some implementations, the super-resolution model is a convolutional neural network (CNN) model, for example, an super resolution convolutional neural network (SRCNN) model or an efficient sub-pixel convolutional neural network (EPCON) model, or the super-resolution model may be a generative adversarial network (GAN) model, for example, a super resolution generative adversarial network SRGAN model or an enhanced super resolution generative adversarial network ESRGAN model.

According to a second aspect, an embodiment of this application provides an image processing apparatus. The apparatus includes one or more modules, and the one or more modules are configured to implement any image processing method in the first aspect.

According to a third aspect, an embodiment of this application provides an electronic device, for example, a terminal. The electronic device includes a processor and a memory. The processor usually includes a central processing unit (CPU) and a graphics processing unit (GPU). The memory is configured to store a computer program. When the CPU is configured to execute the computer program stored in the memory, any image processing method in the first aspect is implemented. The CPU and the GPU may be two chips, or may be integrated on a same chip.

According to a fourth aspect, an embodiment of this application provides a storage medium, where the storage medium may be non-volatile. The storage medium stores a computer program, and when the computer program is executed by a processor, the processor is enabled to implement any image processing method in the first aspect.

According to a fifth aspect, an embodiment of this application provides a computer program or a computer program product, where the computer program or the computer program product includes computer-readable instructions. When the computer program or the computer program product is run on a computer, the computer is enabled to perform any image processing method in the first aspect. The computer program product may include one or more program units, configured to implement the foregoing method.

According to a sixth aspect, this application provides a chip, for example, a CPU. The chip includes a logic circuit, and the logic circuit may be a programmable logic circuit (PLC). When running, the chip is configured to implement any image processing method in the first aspect.

According to a seventh aspect, this application provides a chip, for example, a CPU. The chip includes one or more physical cores and a storage medium. After reading computer instructions in the storage medium, the one or more physical cores implement any image processing method in the first aspect.

According to an eighth aspect, this application provides a chip, for example, a GPU. The chip includes one or more physical cores and a storage medium. After reading computer instructions in the storage medium, the one or more physical cores implement any image processing method in the first aspect.

According to a ninth aspect, this application provides a chip, for example, a GPU. The chip includes a logic circuit, and the logic circuit may be a PLC. When running, the chip is configured to implement any image processing method in the first aspect.

In conclusion, in the embodiments of this application, the target pixel region in the first image is determined, and super-resolution processing is performed on the target pixel region, to implement super-resolution processing on a region in which a pixel that is in the first image and that is different from a pixel in the previous image frame is located. In addition, the another pixel region in the first image is updated by using the another pixel region that is in the previous image frame and that is obtained after super-resolution processing. This achieves an effect that is the same as that of performing super-resolution processing on the another pixel region, and fully utilizes a characteristic of time-domain redundancy of a video. Therefore, an effect of performing full super-resolution processing on the first image is achieved by performing super-resolution processing on a partial region in the first image, to reduce a computation amount of super-resolution processing and reduce computation costs.

Compared with a manner in a conventional technology in which full super-resolution processing is directly performed on a video, processing performed on a test video in the embodiments of this application can reduce approximately 45% of a super-resolution computation amount. In this case, the super-resolution computation amount is significantly reduced. This helps increase a video processing speed and ensures that the video can satisfy a basic frame rate requirement, thereby ensuring real-time performance of the video and preventing a play delay, frame freezing, and the like. In addition, reduction of the computation amount means that a computing unit in a super-resolution display apparatus has fewer processing tasks and lower consumption, so that overall power consumption and electricity consumption of the apparatus are reduced.

In addition, the partial super-resolution algorithm proposed in the embodiments of this application leads to effect deterioration and in which super-resolution processing is performed on only a part of an image region and the other parts are processed by a non-super-resolution processing means, but a method for avoiding repeated super-resolution processing on an unchanged region and redundant time domain information of adjacent image frames of a video. The partial super-resolution algorithm is a method for maximizing information utilization. For the first image on which the partial super-resolution algorithm is executed, the mask pattern is set to guide implementation of super-resolution processing accurate to a pixel level by using the super-resolution model. In a finally processed video, all pixel values of each image frame are essentially from a super-resolution computation result, thereby achieving a same display effect as that achieved by using a conventional full super-resolution algorithm, without reducing the display effect.

In addition, if super-resolution processing is performed by using the super-resolution model in a manner of inputting a mask sub-pattern and a target image block complexity of super-resolution processing performed each time by using the super-resolution model is relatively low, and a requirement for structural complexity of the super-resolution model is relatively low. This can simplify the super-resolution model, reduce a requirement for processor performance, and improve efficiency of super-resolution processing.

BRIEF DESCRIPTION OF DRAWINGS

FIG. 3 is a schematic diagram of pixel values of a first image according to an embodiment of this application;

FIG. 4 is a schematic diagram of pixel values of a second image according to an embodiment of this application;

DESCRIPTION OF EMBODIMENTS

Figure 1:
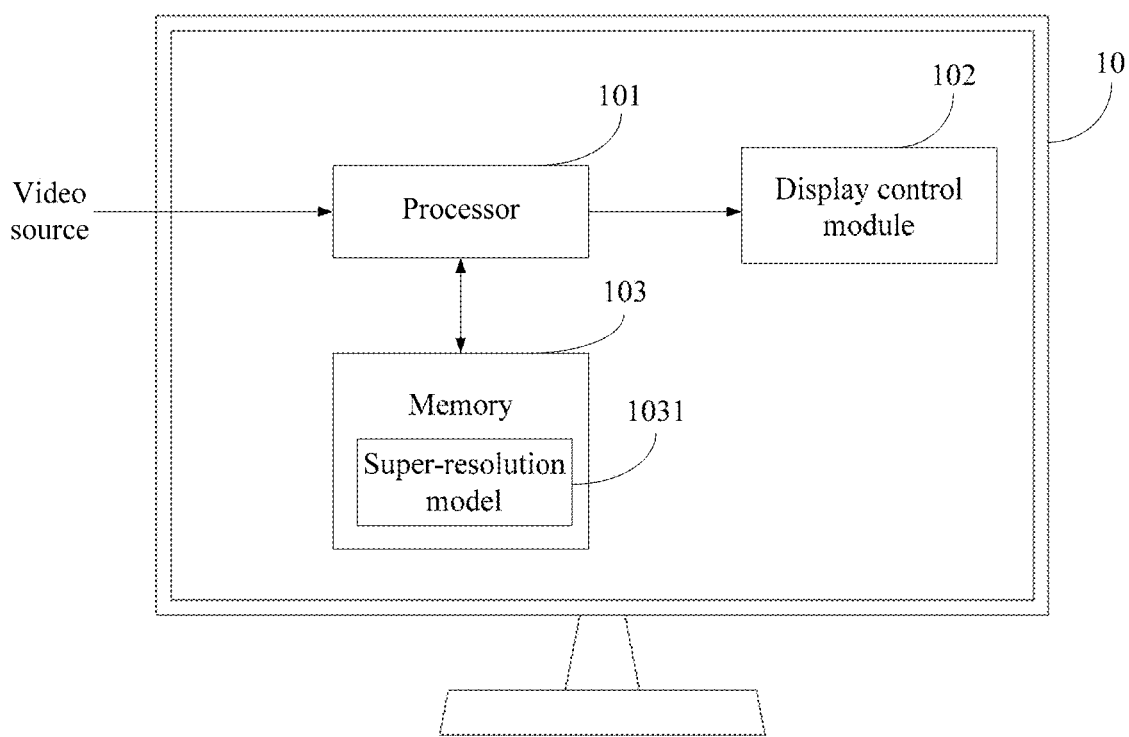
FIG. 1 is a schematic diagram of a structure of a super-resolution display apparatus used in an image processing method according to an embodiment of this application.

To make the objectives, technical solutions, and advantages of this application clearer, the following further describes embodiments of this application in detail with reference to the accompanying drawings.

For ease of understanding, the following first explains terms in the embodiments of this application.

Unless otherwise specified, "a plurality of" in this application means two or more or "at least two". "A and/or B" in this application includes at least three cases: "A", "B", and "A and B".

Image resolution: It is used to reflect an amount of information stored in an image, and refers to a total quantity of pixels in the image. The image resolution is usually expressed by a quantity of horizontal pixels×a quantity of vertical pixels.

1080p: a display format, where p indicates a progressive scan. An image resolution of 1080p is usually 1920×1080.

2K resolution: a display format. A corresponding image resolution is usually 2048×1152.

4K resolution: a display format. A corresponding image resolution is usually 3840×2160.

480p resolution: a display format. A corresponding image resolution is usually 640×480.

360p resolution: a display format. A corresponding image resolution is usually 480×360.

Super-resolution (may also be referred to as super resolution) processing is a technology for reconstructing a low-resolution image into a high-resolution image. In other words, an image resolution of the reconstructed image is higher than an image resolution of the image before the reconstruction. The reconstructed image is also referred to as a super-resolution image. For example, super-resolution processing may be reconstructing an image with a 360p resolution into an image with a 480p resolution or reconstructing an image with a 2K resolution into an image with a 4K resolution.

A color space, also referred to as a color model, a color space, or a color system, is used to reflect a color in an image. Different color spaces correspond to different color coding formats. Currently, two more commonly used color spaces are a YUV color space and an RGB color space (each color in a color space is also referred to as a color channel), and corresponding color coding formats are a YUV format and an RGB format.

When a color coding format is the YUV format, a pixel value of a pixel includes a value of a luminance component Y, a value of a chroma component U. and a value of a chroma component V. When a color coding format is the RGB format, a pixel value of a pixel includes a value of a transparency component and values of a plurality of color components, and the plurality of color components may include a red component R, a green component G, and a blue component B.

A convolutional neural network (CNN) is a type of feedforward neural network, and an artificial neuron of the convolutional neural network can respond to surrounding cells in a part of a coverage range and can perform image processing based on an image feature.

Usually, a basic structure of the convolutional neural network includes two layers. One layer is a feature extraction layer, where an input of each neuron is connected to a local receptive field of a previous layer, and a feature of the local receptive field is extracted. The other layer is a feature mapping layer, where each feature mapping layer of the network includes a plurality of feature mappings, and each feature mapping is a plane. An activation function is configured at the feature mapping layer. Usually, the activation function is a nonlinear mapping function, and may be a sigmoid function or a neural network regression (rectified linear unit, ReLU) function. The convolutional neural network is formed by connecting a large quantity of nodes (also referred to as "neurons" or "cells") to each other. Each node represents a specific output function. A connection between every two nodes represents a weighted value, and is referred to as a weight. Different weights and activation functions lead to different outputs of the convolutional neural network.

Usually, the convolutional neural network includes at least one convolutional layer, where each convolutional layer includes one feature extraction layer and one feature mapping layer. When the convolutional neural network includes a plurality of convolutional layers, the plurality of convolutional layers are successively connected. A receptive field is a region to which each pixel is mapped in an original image (which is an image input into the convolutional neural network) and that is on a feature map output by each convolutional layer of the convolutional neural network.

Compared with a conventional image processing algorithm, one of advantages of the convolutional neural network is that, a complex image preprocessing process (extraction of an artificial feature and the like) is avoided and an original image can be directly input for end-to-end learning. All conventional neural networks use a full connection mode, in other words, neurons from an input layer to a hidden layer are all connected. This leads to a huge quantity of parameters, and consequently network training is time-consuming and even is difficult to implement. Compared with the conventional neural networks, one of the advantages of the convolutional neural network is that the convolutional neural network avoids such problems such as local connection and weight sharing.

FIG. 1 is a schematic diagram of a structure of a super-resolution display apparatus 10 used in an image processing method according to an embodiment of this application. The super-resolution display apparatus 10 may be a product or component that has a display function and a super-resolution processing function. For example, the product or component may be a smart television, a smart screen, a smartphone, a tablet computer, electronic paper, a display, a notebook computer, a digital photo frame, or a navigator. The super-resolution display apparatus 10 includes a processor 101, a display control module 102, and a memory 103. The processor 101 is configured to process an image in a video obtained from a video source and transmit a processed image to the display control module 102. The processed image adapts to a format requirement of the display control module 102. The display control module 102 is configured to process the received processed image to obtain a drive signal adapted to a display module (not shown in FIG. 1), and drive, based on the drive signal, the display module to display the image. The memory 103 is configured to store video data.

For example, the processor 101 may include a central processing unit (CPU) and/or a graphics processing unit (GPU). The processor 101 may be integrated into a graphics card. The display control module 102 may be a timing controller (TCON) or a microcontroller unit (MCU). The display module may be a display. The memory 103 may be a double data rate (DDR) dynamic random access memory. In some embodiments of this application, the memory 103 stores a super-resolution model 1031, and a process in which the processor 101 processes the image in the video obtained from the video source may include: decoding the video obtained from the video source, preprocessing an image obtained through decoding (for example, step 201 or step 202 in the following), inputting a preprocessed image into the super-resolution model 1031, and performing super-resolution processing on the preprocessed image by using the super-resolution model 1031. For example, the super-resolution model may be a CNN model, for example, a super-resolution convolutional neural network (SRCNN) model or an efficient sub-pixel convolutional neural network (ESPCN) model. The super-resolution model may alternatively be a generative adversarial network (GAN) model, for example, a super-resolution generative adversarial network (SRGAN) model or an enhanced super-resolution generative adversarial network (ESRGAN) model.

Currently, the super-resolution display apparatus directly inputs the decoded image into the super-resolution model, and performs super-resolution processing on the image by using the super-resolution model. However, in such an image processing method, a computation amount of super-resolution processing is relatively large, and computation costs are relatively high.

Figure 2:
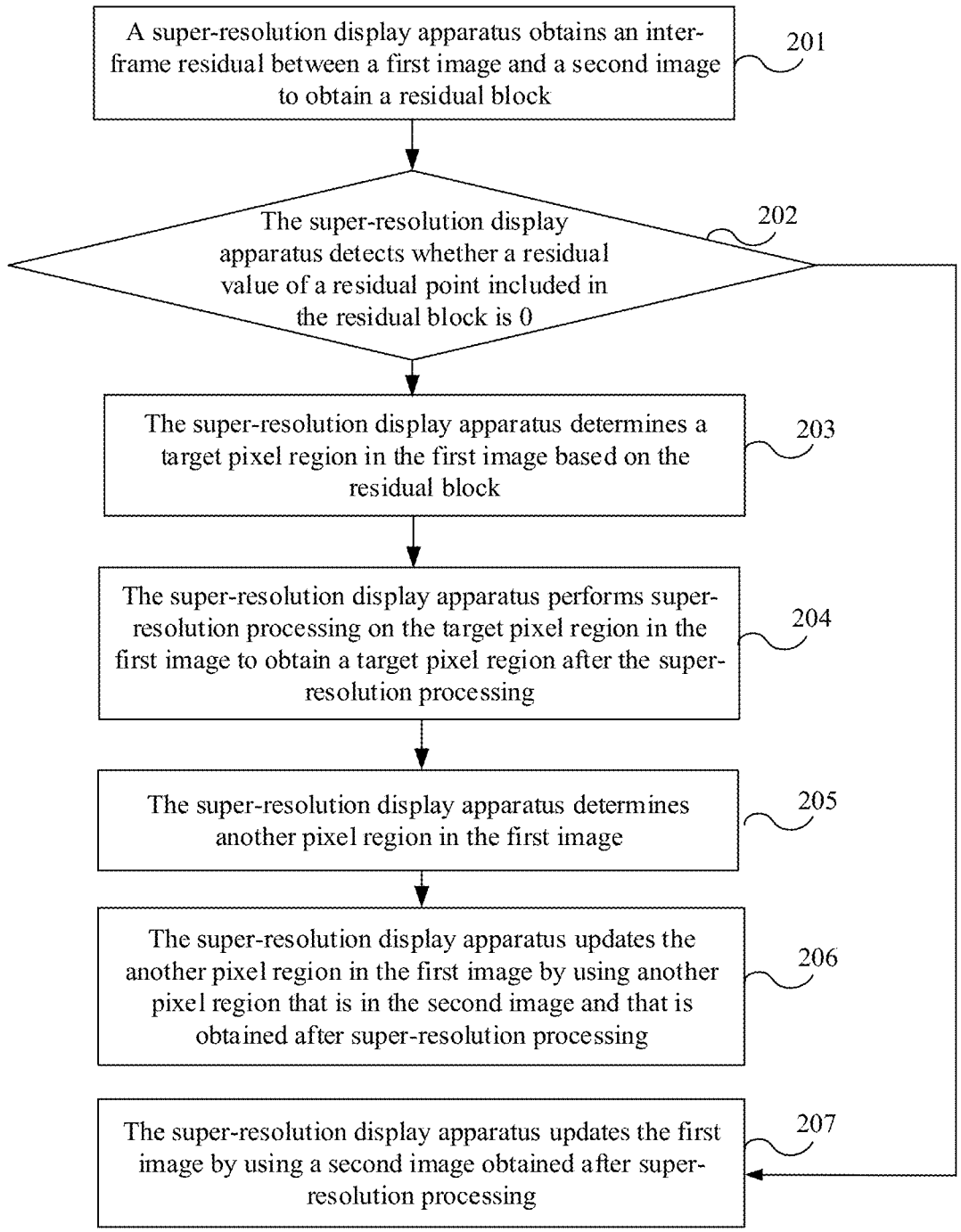
FIG. 2 is a flowchart of an image processing method according to an embodiment of this application.

An embodiment of this application provides an image processing method and proposes a partial super-resolution algorithm, to reduce a computation amount of super-resolution processing and reduce computation costs. The image processing method may be applied to the super-resolution display apparatus shown in FIG. 1. Because a video may include a plurality of images, in some embodiments of this application, the image processing method is described by using a first image as an example. The first image is an image frame in the video, and the first image is a non-first image frame (that is, the first image is not the first image frame) in the video. For a method for processing another non-first image frame, refer to the method for processing the first image. It is assumed that a previous image frame adjacent to the first image is a second image. As shown in FIG. 2, the method includes the following steps.

Step 201: The super-resolution display apparatus obtains an inter-frame residual between the first image and the second image to obtain a residual block.

The inter-frame residual is an absolute value of a difference between pixel values of the two adjacent image frames in the video, and can reflect a content change (namely, a pixel value change) between the two adjacent image frames. The residual block is a calculation result of the inter-frame residual, and a size of the residual block is the same as a size of the first image and a size of the second image. The residual block includes a plurality of residual points that are in a one-to-one correspondence with locations of a plurality of pixels in the first image, and each residual point has one residual value. Each residual value is an absolute value of a difference between pixel values of pixels at corresponding locations in the first image and the second image.

In some embodiments of this application, there ae a plurality of manners of obtaining the residual block. In some embodiments of this application, the following two manners are used as examples to describe a manner of obtaining the residual block.

In some embodiments, the inter-frame residual between the first image and the second image is calculated to obtain the residual block. The inter-frame residual is an absolute value of a difference between pixel values of pixels at corresponding locations in the first image and the second image. Assuming that the first image is a $t^{th}$ image frame in the video and t×1, the second image is a $(t-1)^{th}$ image frame.

In a first example, when a color space of the first image and the second image is an RGB color space, a color coding format used in the first image and the second image is an RGB coding format. In this case, values of transparency components in pixel values of pixels in the first image and the second image are usually ignored in the inter-frame residual, and a pixel value of a pixel in each of the first image and the second image includes values of a red component R, a green component G, and a blue component B. Therefore, the inter-frame residual Residual includes Residual[R], Residual[G], and Residual[B]. In this case, the inter-frame residual Residual satisfies the following formulas:

$$\text{Residual}[R] = \text{Absdiff}(R_{Frame(t-1)}, R_{Frame(t)}) \quad \text{(Formula 1)}$$

$$\text{Residual}[G] = \text{Absdiff}(G_{Frame(t-1)}, G_{Frame(t)}) \quad \text{(Formula 2)}$$

$$\text{Residual}[B] = \text{Absdiff}(B_{Frame(t-1)}, B_{Frame(t)}) \quad \text{(Formula 3)}$$

Absdiff represents calculation of an absolute value of a difference between pixel values (R values, G values, or B values) of pixels at corresponding locations in the two images: Frame(t) represents the first image: Frame(t−1) represents the second image; $R_{Frame(t-1)}$ represents a value of a red component R of the second image; $R_{Frame(t)}$ represents a value of a red component R of the first image; $G_{frame(t-1)}$ represents a value of a green component G of the second image: $G_{Frame(t)}$ represents a value of a green component G of the first image; $B_{Frame(t-1)}$ represents a value of a blue component B of the second image; and $B_{Frame(t)}$ represents a value of a blue component B of the first image.

In a second example, when a color space of the first image and the second image is a YUV color space, a color coding format used in the first image and the second image is a YUV coding format. In this case, the inter-frame residual between the first image and the second image is represented by using an inter-frame residual between luminance components Y of the first image and the second image, so that the inter-frame residual Residual is equal to Residual[Y].

In an optional manner, the inter-frame residual Residual satisfies the following formula:

Residual=Residual[Y]=0.299×Residual[R]+0.587× Residual[G]+0.144×Residual[B]   (Formula 4)

For manners of obtaining Residual[R], Residual[G], and Residual[B], refer to Formula 1 to Formula 3, respectively. The inter-frame residual Residual is obtained by converting, according to specific proportions, the inter-frame residuals corresponding to the foregoing three RGB color channels.

In another optional manner, the inter-frame residual Residual satisfies the following formula:

Residual=|Residual[Y1]−Residual[Y2]|   (Formula 5)

Residual[Y1] is a value of a luminance component of the first image, and is obtained by converting RGB values of the first image according to specific proportions; and Residual [Y2] is a value of a luminance component of the second image, and is obtained by converting RGB values of the second image according to the specific proportions. The specific proportions may be proportions in Formula 4. To be specific, the proportions corresponding to the R value, the G value, and the B value are respectively 0.299, 0.587, and 0.144.

Figures 5, 6:
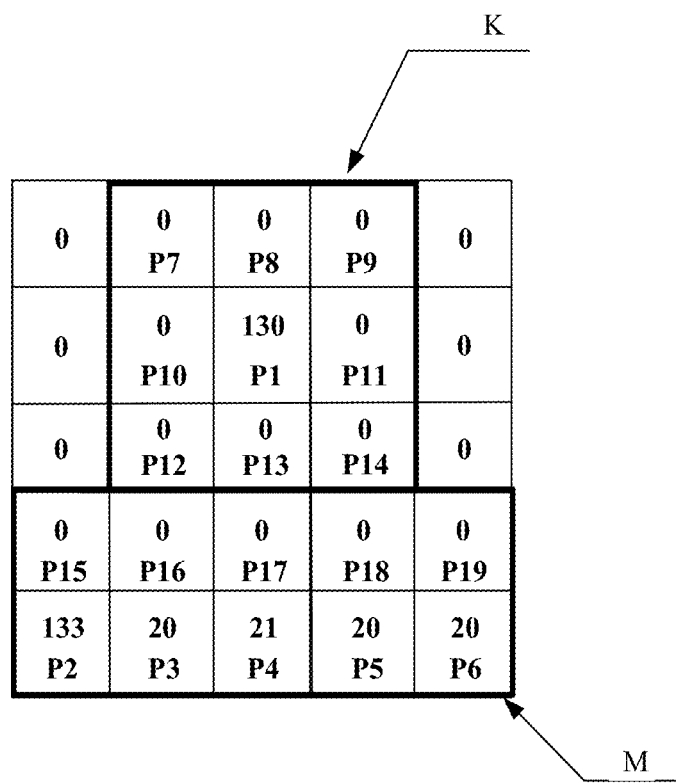
FIG. 5 is a schematic diagram of a residual block according to an embodiment of this application.
FIG. 6 is a schematic diagram of explaining a principle of a residual block shown in FIG. 5.

For example, it is assumed that the first image and the second image each include 5×5 pixels and a luminance component Y is used to represent a pixel value. Pixel values of pixels in the first image are shown in FIG. 3, and pixel values of pixels in the second image are shown in FIG. 4. In this case, a finally obtained residual block is shown in FIG. 5, and includes 5×5 residual points. A residual value of each residual point is an absolute value of a difference between pixel values of pixels at corresponding locations in the first image and the second image.

It should be noted that, the protection scope of the embodiments of this application is not limited thereto. When a color coding format of an image is another format, any person skilled in the art can also readily figure out, within the technical scope disclosed in the embodiments of this application, a variation or replacement by using the inter-frame residual calculation method provided in the embodiments of this application, to calculate an inter-frame residual. Therefore, the variation or replacement readily figured out also falls within the protection scope of the embodiments of this application.

In some embodiments, a prestored inter-frame residual is obtained to obtain the residual block.

As described above, the first image obtained by the super-resolution display apparatus is a decoded image. In a video decoding process, a process of calculating an inter-frame residual between two adjacent image frames is involved. Therefore, in the video decoding process, a calculated inter-frame residual between every two adjacent image frames may be stored. When a residual block needs to be obtained, the residual block can be obtained by directly extracting the prestored inter-frame residual.

In some embodiments of this application, a standard used by the processor to perform video decoding may be any one of H.261 to H.265, moving picture experts group (MPEG)-4 V1 to MPEG-4 V3, and the like. H.264 is also referred to as advanced video coding (AVC), H.265 is also referred to as high efficiency video coding (HEVC), and a motion compensation hybrid coding algorithm is used in both H.264 and H.265.

H.265 is used as an example. A coding architecture of H.265 is approximately similar to that of H.264, and mainly includes modules such as an entropy decoding module, an intra prediction module, an inter prediction module, an inverse transformation module, an inverse quantization module, and a loop filtering module. The loop filtering module includes a deblocking filtering module, a sample adaptive offset (SAO) module, and the like. The entropy decoding module is configured to process a bitstream provided by the video source, to obtain mode information and an inter-frame residual. In this case, after the entropy decoding module performs processing to obtain the inter-frame residual, the inter-frame residual may be stored to extract the inter-frame residual when step 201 is performed.

By obtaining the residual block, repeated calculation of the inter-frame residual can be reduced, computation costs can be reduced, and overall image processing duration can be reduced. Especially in a scenario in which an image resolution of the video provided by the video source is relatively high, an image processing delay can be effectively reduced.

Step 202: The super-resolution display apparatus detects whether a residual value of a residual point included in the residual block is 0; and if a residual value of at least one residual point included in the residual block is not 0, performs step 203; or if residual values of all residual points included in the residual block are 0, performs step 207.

The super-resolution display apparatus may traverse all the residual points in the residual block, and detect whether a residual value of each residual point is 0. When a residual value of at least one residual point in the residual block is not 0, the super-resolution display apparatus may perform step 203. The following steps 203 to 206 correspond to a partial super-resolution algorithm. When residual values of all the residual points in the residual block are 0, the super-resolution display apparatus may perform step 207. For example, the super-resolution display apparatus may traverse the residual points in a scanning order from left to right and from top to bottom.

Step 203: The super-resolution display apparatus determines a target pixel region in the first image based on the residual block.

In some embodiments of this application, the target pixel region is a region that is in the first image and in which a pixel corresponding to a location of a target residual point in the residual block is located, and a point that is in the first image and that corresponds to a location of a target residual point is referred to as a target pixel. Usually, the target residual point includes two types of residual points: a first target residual point and a second target residual point.

Optionally, the target pixel region includes a region that is in the first image and in which a pixel corresponding to a location of a first target residual point is located. For example, the target pixel region is a region that is in the first image and in which pixels corresponding to locations of the first target residual point and a second target residual point are located. The first target residual point is a point that is in the residual block and whose residual value is greater than a specified threshold, and the second target residual point is a residual point that is in the residual block and that is around the first target residual point. A residual point around the first target residual point is a residual point arranged around the first target residual point, and is a peripheral point that is of the first target residual point and that satisfies a specified condition. For example, the residual point around the first target residual point is a residual point above, below, on the left of, or on the right of the first target residual point, or is a residual point above, below, on the left of, on the right of, on the upper left of, on the lower left of, on the upper right of, or on the lower right of the first target residual point. Optionally, the specified threshold is 0.

For example, the second target residual point is a residual point that is in the residual block and around the first target residual point and whose residual value is not greater than (that is, less than or equal to) the specified threshold. In other words, the second target residual point is a point whose residual value is not greater than the specified threshold and that is in a peripheral point that is of the first target residual point and that satisfies the specified condition. When the specified threshold is 0, the second target residual point is a residual point that is in the residual block and around the first target residual point and whose residual value is 0.

A region in which the first target residual point is located is a region in which content of the first image is different from that of the second image. A region that is in the first image and on which super-resolution processing actually needs to be performed can be found based on the region. Because super-resolution processing of a region in the first image usually needs to be performed based on a pixel value of a pixel in a peripheral region of the region, the peripheral region of the region that is in the first image and on which super-resolution processing needs to be performed further needs to be found. In addition, a region in which the second target residual point is located is a peripheral region of the region in which the first target residual point is located. In this case, the peripheral region of the region that is in the first image and on which super-resolution processing actually needs to be performed may be determined by determining the second target residual point, to adapt to a super-resolution processing requirement and ensure that effective super-resolution processing is performed subsequently. The specified condition is determined based on the super-resolution processing requirement. For example, the specified condition is set based on a receptive field (for example, a receptive field of the last convolutional layer) in a super-resolution model.

It is assumed that the first target residual point is a point that is in the residual block and whose residual value is greater than the specified threshold, the second target residual point is a residual point that is in the residual block and around the first target residual point and whose residual value is not greater than the specified threshold, and the specified threshold is 0. A residual block shown in FIG. 6 is used as an example. FIG. 6 is a schematic diagram of explaining a principle of the residual block shown in FIG. 5. A region in which a target residual point in the residual block is located is a region including a region K and a region M. The region K includes a first target residual point P1 and second target residual points P7 to P14 around the first target residual point P1. The region M includes first target residual points P2 to P6 and second target residual points P15 to P19 around the first target residual points P2 to P6. Therefore, finally determined first target residual points are P1 to P6, and finally determined second target residual points include P7 to P19. In this case, target pixels determined in the first image are pixels at same locations as the residual points P1 to P19. In FIG. 6, a description is provided by using an example in which peripheral points satisfying a specified condition are residual points above, below, on the left of, on the right of, on the upper left of, on the lower left of, on the upper right of, and on the lower right of each first target residual point. However, this is not limited.

In some embodiments of this application, the target pixel region may be determined in a plurality of manners. In some embodiments of this application, the following two determining manners are used as examples for description.

Figure 7:
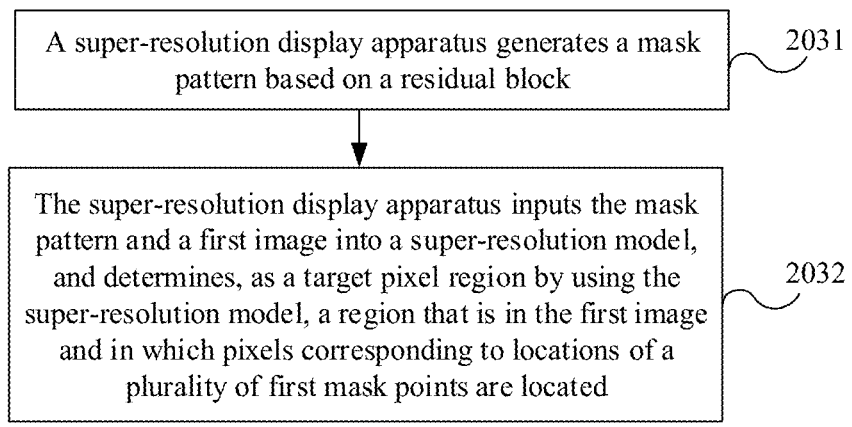
FIG. 7 is a schematic flowchart of determining a target pixel region in a first image according to an embodiment of this application.

In a first determining manner, the target pixel region is determined in the super-resolution model. As shown in FIG. 7, the process of determining a target pixel region in the first image based on the residual block includes the following steps.

Step 2031: The super-resolution display apparatus generates a mask pattern based on the residual block.

The mask pattern is used to indicate a location of the target pixel region, and has a function of guiding selection of the target pixel region in the first image. The mask pattern includes a plurality of first mask points, the plurality of first mask points are in a one-to-one correspondence with locations of a plurality of target residual points in the residual block, and the plurality of target residual points include at least a first target residual point. Usually, the plurality of target residual points include the first target residual point and a second target residual point. In other words, the plurality of first mask points are used to identify locations of the plurality of target residual points in the residual block. Because the plurality of target residual points in the residual block are in a one-to-one correspondence with locations of a plurality of target pixels in the target pixel region in the first image, the plurality of first mask points are used to identify locations of a plurality of target pixel regions in the first image. A target pixel region in which a target pixel is located may be found by using a first mask point.

In some embodiments of this application, step 2031 is schematically described by using the following two optional implementations as examples.

In a first optional implementation, morphological transformation processing may be performed on the residual block to obtain the mask pattern. The morphological transformation processing includes binarization processing and dilation processing. For example, binarization processing is first performed on the residual block to obtain a residual block after the binarization; and then dilation processing is performed on the residual block obtained after the binarization, to obtain a residual block after the dilation, and the residual block obtained after the dilation is used as the mask pattern.

The binarization processing is a processing manner in which a pixel value of each pixel in an image is set to one of two pixel values: a first value and a second value. The first value is different from the second value. After the binarization processing, the image includes only pixels corresponding to the two pixel values. The binarization processing can reduce interference of various elements in the image to a subsequent image processing process.

A residual value of each residual point in the residual block is an absolute value of a difference between pixel values of two pixels, and the residual block is equivalent to a difference image of two images. Therefore, the residual block may also be regarded as an image, a residual point included in the residual block is equivalent to a pixel in the image, and a residual value of the residual point is equivalent to a pixel value of the pixel.

For example, in the RGB color space, because a residual value of each residual point includes values of three color components R, G, and B, namely, Residual[R], Residual[G], and Residual[B], the residual value of the residual point may be represented by a grayscale value of the residual point to simplify a calculation process. The grayscale value of the residual point is used to reflect a luminance of the residual point. The grayscale value of the residual point may be obtained by converting the R, G, and B values of the residual point, that is, by converting the residual value of the residual point, for example, Residual[R], Residual[G], and Residual [B]. For the conversion process, refer to a conventional process of converting R, G, and B values to obtain a grayscale value. Details are not described in this application. A range of the grayscale value of the residual point is usually 0 to 255, a grayscale value of a white residual point is 255, and a grayscale value of a black residual point is 0. During binarization processing on the residual block, whether a residual value of each residual point in the residual block is greater than a binarization threshold (for example, the binarization threshold may be a fixed value or may be a variable value; and when the binarization threshold is a variable value, the binarization threshold may be determined through local adaptive binarization) may be determined. When a residual value of a residual point is greater than the binarization threshold, the residual value of the residual point is set to the first value. When a residual value of a residual point is less than or equal to the binarization threshold, the residual value of the residual point is set to the second value.

For example, in the YUV color space, because a residual value of each residual point includes one value, namely, Residual [Y], during binarization processing on the residual block, whether a residual value of each residual point in the residual block is greater than a binarization threshold (for example, the binarization threshold may be a fixed value or may be a variable value; and when the binarization threshold is a variable value, the binarization threshold may be determined through local adaptive binarization) may be determined. When a residual value of a residual point is greater than the binarization threshold, the residual value of the residual point is set to the first value. When a residual value of a residual point is less than or equal to the binarization threshold, the residual value of the residual point is set to the second value.

For example, the first value is a non-zero value, and the second value is 0. For example, the first value is 255, and the second value is 0. Alternatively, the first value is 1, and the second value is 0. During some implementations, a smaller value indicates smaller occupied storage space. Therefore, usually, the first value is set to 1 and the second value is set to 0, to save storage space.

The binarization threshold may be determined based on the specified threshold. For example, in the RGB color space, because the grayscale value of the residual point is compared with the binarization threshold, and the grayscale value of the residual point is obtained by converting the residual value, the binarization threshold is obtained by converting the specified threshold by using a same conversion rule. In the YUV color space, because the residual value of the residual point is compared with the binarization threshold, the binarization threshold is equal to the specified threshold. For example, the specified threshold may be 0. Correspondingly, the binarization threshold may be 0.

In the residual block obtained after the binarization in the foregoing manners, there are only two types of values, thereby reducing complexity of subsequent calculation. In addition, a residual point corresponding to the first value is a first target residual point, so that the first target residual point can be positioned simply and quickly in a subsequent processing process.

Any method of a global binarization threshold method, a local binarization threshold method, a maximum between-cluster variance method, and an iterative binarization threshold method may be used for the binarization processing in some embodiments of this application. This is not limited in this embodiment of this application.

The dilation processing is a type of processing for obtaining a local maximum value. Convolution is performed on a to-be-processed image and a preset kernel (also referred to as a kernel). In each convolution process, a maximum value in a kernel coverage area is assigned to a specified pixel, so that a bright pixel is brighter. An achieved effect is that a bright region of the to-be-processed image is dilated. The kernel has a definable anchor point, the anchor point is usually a central point of the kernel, and the specified pixel is the anchor point.

Figure 8:
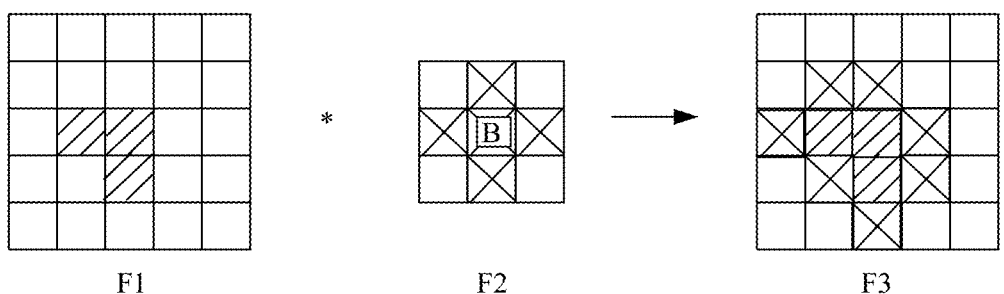
FIG. 8 is a schematic diagram of a principle of dilation processing according to an embodiment of this application.

As shown in FIG. 8, it is assumed in FIG. 8 that a to-be-processed image is F1. The to-be-processed image includes 5×5 pixels, and a shadow in the image indicates bright spots. A kernel is a shadow part in F2, there are five pixels in total, and an anchor point is a central point B of the five pixels. In this case, a final image obtained after dilation processing is F3. "*" in FIG. 8 represents a convolution operation.

Figure 9:
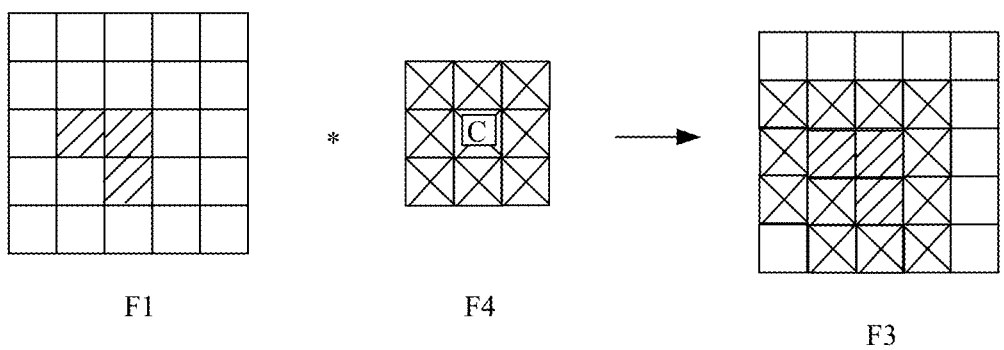
FIG. 9 is a schematic diagram of another principle of dilation processing according to an embodiment of this application.

In some embodiments of this application, a to-be-processed image is the residual block, and performing dilation processing on the residual block is to perform dilation processing on the first target residual point in the residual block obtained after the binarization. To adapt to a dilation processing requirement, if the first value is a non-zero value and the second value is 0, the first target residual point is a bright spot, and other residual points (namely, points other than the first target residual point) are dark spots. In this case, the dilation processing may be directly performed to implement dilation of the region in which the first target residual point is located. If the first value is 0 and the second value is a non-zero value, by using a specified algorithm, the first value may be updated to a non-zero value, and the second value may be updated to 0. In this way, the first target residual point is a bright spot, the other residual points are dark spots, and then the dilation processing is performed. It should be noted that, with reference to FIG. 8 and FIG. 9, if a residual block is F1, and a residual block obtained after dilation processing is F3, residual points corresponding to shadows indicated by oblique lines in F1 and F3 are first target residual points, and residual points corresponding to shadows indicated by "×" in F3 are second target residual points. A kernel in FIG. 9 is F4, and is different from F2 in FIG. 8. A final residual block F3 formed after dilation processing is different from that in FIG. 8, in other words, a mask pattern is different from that in FIG. 8.

In some embodiments of this application, the super-resolution model includes at least one convolution kernel, and a kernel for the dilation processing has a same size as a receptive field of the last convolutional layer of the super-resolution model. The last convolutional layer is an output layer of the super-resolution model, an image obtained through super-resolution processing by using the super-resolution model is output from this layer, and the receptive field of the layer is a largest receptive field among receptive fields corresponding to all convolutional layers in the super-resolution model. A size of a mask pattern obtained in this way matches a size of the largest receptive field of the super-resolution model. This implements a good guiding function, avoids a case in which an image subsequently input into the super-resolution model cannot be convolved by the convolutional layer because a region that is in the image and on which convolution can be performed is excessively small, and ensures that super-resolution processing can be effectively performed on the image subsequently input into the super-resolution model. For example, the size of the kernel may be 3×3 pixels or 5×5 pixels.

In a second optional implementation, a principle of the dilation processing is similar to an algorithm for finding an m-neighborhood. A neighborhood refers to an open interval with a target point as a center. The algorithm for finding an m-neighborhood refers to obtaining, by using a target point as a center, an open interval including m points adjacent to the target point, where m is a value obtained by subtracting 1 from a size of the receptive field of the last convolutional layer in the super-resolution model. For example, if the receptive field of the last convolutional layer in the super-resolution model is 5×5 pixels, m=8. As shown in FIG. 8 and FIG. 9, dilation processing in FIG. 8 is equivalent to finding a 4-neighborhood for each first target residual point in the image F1, and dilation processing in FIG. 9 is equivalent to finding an 8-neighborhood for each first target residual in the image F1. In some embodiments of this application, the receptive field of the last convolutional layer in the super-resolution model is usually 3×3 pixels or 5×5 pixels, m=8 or m=24. When m=8, an 8-neighborhood refers to a total of 8 points above, below, on the left of, on the right of, on the upper left of, on the lower left of, on the upper right of, and on the lower right of a target point that is used as a center. When m=24, a 24-neighborhood refers to a total of 24 points, namely, a total of 8 points above, below, on the left of, on the right of, on the upper left of, on the lower left of, on the upper right of, and on the lower right of a target point that is used as a center and 16 points around the 8 points.

In this case, step 2031 includes first performing binarization processing on the residual block to obtain a residual block after the binarization, then finding an m-neighborhood for each first target residual point in the residual block obtained after the binarization, and filling a residual value (namely, the first value) of each target residual point in the corresponding n-neighborhood to obtain the mask pattern. For the binarization processing process, refer to the foregoing implementations. For a method for finding the m-neighborhood, refer to a related technology. Details are not described in this embodiment of this application.

It should be noted that, in some embodiments of this application, the process of generating a mask pattern based on the residual block in step 2031 may alternatively be implemented in other manners. For example, the process includes: generating, based on the residual block, an initial mask pattern including a plurality of mask points, where the plurality of mask points are in a one-to-one correspondence with locations of the plurality of pixels in the first image, and the plurality of mask points include the plurality of first mask points and a plurality of second mask points, or in other words, the initial mask pattern is a pattern in which the first mask points and the second mask points are determined, and assigning a first value to a mask value of the first mask point in the initial mask pattern, and assigning a second value to a mask value of the second mask point in the mask pattern, to obtain the mask pattern, where the first value is different from the second value. In this way, the obtained mask pattern is a binarized image. During subsequent positioning of a target pixel, the first mask point may be positioned by searching for the first value, and then the target pixel is indexed, so that the target pixel can be quickly determined.

In some embodiments of this application, the entire residual block may be directly processed to generate the mask pattern. Alternatively, the residual block may be divided into a plurality of residual sub-blocks, each residual sub-block is processed to obtain a mask sub-pattern, and the generated mask sub-patterns form the mask pattern. Because the mask pattern is generated in blocks, computation complexity can be reduced, and computation costs can be reduced. When a computation capability of the processor is relatively strong, processes of generating a plurality of mask sub-patterns may be performed at the same time, thereby reducing image processing duration.

For example, the step of generating a mask pattern based on the residual block may include the following steps.

Step A1: Divide the residual block into a plurality of residual sub-blocks, and perform block division processing on each residual sub-block obtained through the division, where the block division processing includes: when a residual value of at least one residual point included in the residual sub-block is not 0 (that is, the residual sub-block includes a residual point whose residual value is not 0), dividing the residual sub-block into a plurality of residual sub-blocks, and performing block division processing on each residual sub-block obtained through the division, until residual values of all residual points included in a residual sub-block obtained through the division are 0 (that is, the residual sub-block does not include a residual point whose residual value is not 0), a total quantity of residual points in a residual sub-block obtained through the division is less than a point quantity threshold, or a total quantity of times for dividing the residual block reaches a quantity of times threshold.

When the residual values of all the residual points included in the residual sub-block obtained through the division are 0, it indicates that there is no content change between regions that are in the first image and the second image and that correspond to the residual sub-block, and the block division does not need to be continued. When the total quantity of residual points in the residual sub-block obtained through the division is less than the point quantity threshold, it indicates that a size of the residual sub-block obtained through the division is sufficiently small. If further division is performed on the residual sub-block, in a subsequent process, if a corresponding target image block is input into the super-resolution model (refer to the following step B2), a case in which effective super-resolution cannot be performed by using the super-resolution model is easily caused, affecting a super-resolution effect of the super-resolution model. In addition, a size of a residual sub-block is excessively small. This easily leads to excessively high computation costs. Therefore, there is no longer any need to perform division. When the total quantity of times for dividing the residual block reaches the quantity of times threshold, if the division is continued, excessively high computation costs may be caused due to an excessively large quantity of times of division. In addition, a size of a residual sub-block obtained through the division may be excessively small, affecting a super-resolution effect. Therefore, the division does not need to be continued either, to reduce computation costs and ensure the super-resolution effect. For example, the point quantity threshold and the quantity of times threshold may be determined based on an image resolution of the first image. For example, the point quantity threshold and the quantity of times threshold are positively correlated with the image resolution of the first image. To be specific, a higher image resolution leads to a larger point quantity threshold and a larger quantity of times threshold. Usually, the quantity of times threshold may be 2 or 3.

By performing step A1, cyclic division on the residual block can be implemented to finally obtain a plurality of residual sub-blocks. When the computation capability of the processor is relatively strong, and the plurality of residual sub-blocks all need to be divided, processes of dividing the plurality of residual sub-blocks may be performed at the same time, thereby reducing image processing duration.

Block division may be performed on both the residual block and the residual sub-block in a binary tree division manner or a quadtree division manner. When binary tree division is performed on the residual block or the residual sub-block, the residual block or the residual sub-block is divided into two residual sub-blocks with an equal size or unequal sizes each time. When quadtree division is performed on the residual block or the residual sub-block, the residual block or the residual sub-block is divided into four residual sub-blocks with an equal size or unequal sizes each time. It should be noted that, the residual block and the residual sub-block may alternatively be divided in another manner, provided that effective block division can be implemented. This is not limited in this embodiment of this application.

In a conventional video decoding process, block division needs to be performed on an image, and block division is usually performed in a quadtree division manner. Therefore, in some embodiments of this application, when block division is performed on the residual block and the residual sub-block in the quadtree division manner, a conventional image processing method may be used. For example, in some applications, an image division module used in the foregoing video decoding process may alternatively be used to divide the residual block and the residual sub-block, to reuse the module and reduce computation costs. As described above, generally, an image resolution of an image in the video is 360p, 480p, 720p. 1080p, 2K, 4K. and the like, and are all integer multiples of 4. Therefore, when the quadtree division manner is used, during each division, the residual block or the residual sub-block may be divided into four residual sub-blocks with an equal size, in other words, quartering of the residual block or the residual sub-block is implemented, so that residual blocks obtained through the division have a uniform size, facilitating subsequent processing. Certainly, after the residual block is divided for a plurality of times, there may be a case in which quartering of a residual sub-block cannot be implemented. In this case, the residual sub-block may be evenly divided as much as possible, provided that a size difference between any two residual sub-blocks in four residual sub-blocks obtained after division each time is less than or equal to a specified difference threshold. In this way, a function of a finally obtained mask sub-pattern is not affected.

Step A2: Generate a mask sub-pattern corresponding to each target residual block, where the mask pattern includes the generated mask sub-pattern, and a residual value of at least one residual point included in the target residual block is not 0.

In some embodiments of this application, because residual values of all residual points included in a residual block other than the target residual block are 0, it indicates that there is no content change between regions that are in the first image and the second image and that correspond to the residual sub-block. Super-resolution processing does not need to be performed on the region that is in the first image and that corresponds to the residual sub-block. Therefore, no mask sub-pattern needs to be obtained to guide the target pixel region. In this way, compared with integral generation of the mask pattern, in a manner of generating the mask pattern in blocks, processing of the residual block other than the target residual block can be simplified, and the mask sub-pattern is generated only for the target residual block, thereby reducing computation costs.

For some manners of generating each mask sub-pattern, refer to the two optional implementations of step 2031. For example, morphological transformation processing is performed on each target residual sub-block to obtain a mask sub-pattern corresponding to the target residual sub-block. Specifically, binarization processing is first performed on the target residual sub-block to obtain a target residual sub-block after the binarization, and then dilation processing is performed on the target residual sub-block obtained after the binarization, to obtain a target residual sub-block after the dilation, and the target residual sub-block obtained after the dilation is used as the mask sub-pattern. For another example, binarization processing is first performed on each target residual sub-block to obtain a target residual sub-block after the binarization; and then an m-neighborhood is found for each first target residual point in each target residual sub-block obtained after the binarization, and a residual value of each target residual point is filled in the corresponding m-neighborhood to obtain a corresponding mask sub-pattern. For a processing process of each target residual sub-block, refer to FIG. 8 and FIG. 9. Details are not described again in this embodiment of this application.

Optionally, a size of each mask sub-pattern is the same as a size of a corresponding target residual sub-block.

Step 2032: The super-resolution display apparatus inputs the mask pattern and the first image into the super-resolution model, and determines, as the target pixel region by using the super-resolution model, a region that is in the first image and in which pixels corresponding to locations of the plurality of first mask points are located.

In step 2032, the super-resolution display apparatus determines the target pixel region by using the super-resolution model. A conventional super-resolution model is used to perform super-resolution processing only on a received image. In some embodiments of this application, code that is used to determine a target pixel region may be added at a front end (namely, an input end) of the conventional super-resolution model, to determine the target pixel region. In this way, the super-resolution display apparatus only needs to input the mask pattern and the first image into the super-resolution model, thereby reducing computation complexity of a module in the super-resolution display apparatus other than the super-resolution model.

With reference to the foregoing embodiments, it can be learned that, the mask pattern includes a plurality of mask points, the plurality of mask points are in a one-to-one correspondence with locations of the plurality of pixels in the first image, and each mask point has one mask value. In an optional example, the mask pattern is a binarized image, the plurality of mask points include a plurality of first mask points and a plurality of second mask points, a mask value of the first mask point is a first value, a mask value of the second mask point is a second value, and the first value is different from the second value. As described above, the first value and the second value each may be either a non-zero value or 0. In some embodiments of this application, it is assumed that the first value is a non-zero value (for example, 1) and the second value is 0. In another optional example, the mask pattern is a monochromatic image, and the plurality of mask points include only a plurality of first mask points.

In step 2032, mask points in the mask pattern are traversed by using the super-resolution model; and in the first image, a region in which a pixel (namely, a target pixel) corresponding to a mask point whose mask value is the first value is located is determined as the target pixel region.

Figure 10:
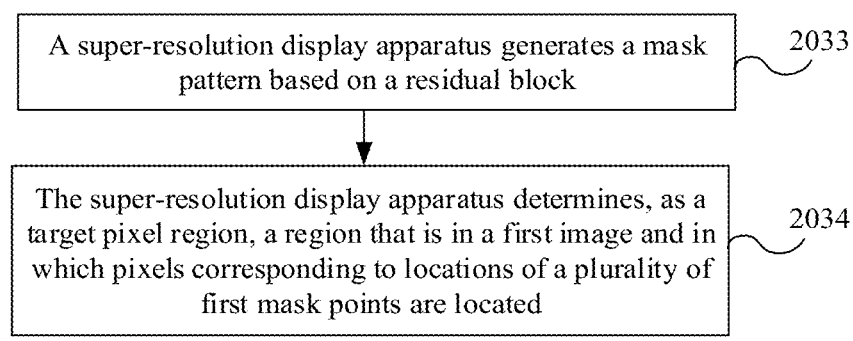
FIG. 10 is another schematic flowchart of determining a target pixel region in a first image according to an embodiment of this application.

In a second determining manner, the target pixel region is determined outside the super-resolution model. As shown in FIG. 10, the process of determining a target pixel region in the first image includes the following steps.

Step 2033: The super-resolution display apparatus generates a mask pattern based on the residual block.

The mask pattern includes a plurality of first mask points, and the plurality of first mask points are in a one-to-one correspondence with locations of a plurality of target residual points in the residual block. For a process of step 2033, refer to the process of step 2031. Details are not described again in this embodiment of this application.

Step 2034: The super-resolution display apparatus determines, as the target pixel region, a region that is in the first image and in which pixels (namely, target pixels) corresponding to locations of the plurality of first mask points are located.

With reference to step 2032, the super-resolution display apparatus may traverse mask points in the mask pattern, and determine, in the first image, a pixel corresponding to a mask point whose mask value is the first value as the target pixel region.

In each of the foregoing two determining manners, the super-resolution display apparatus determines the target pixel region in the first image through guiding of the mask pattern, and shields a pixel other than the target pixel region, to implement fast positioning of the target pixel region, thereby effectively reducing image processing duration.

In some embodiments of this application, the mask pattern may be in a plurality of shapes. In a first example, the mask pattern includes only a plurality of first mask points, in other words, the mask pattern is formed by the plurality of first mask points; and the mask pattern obtained in this way is usually an irregular pattern. In a second example, the mask pattern includes only a plurality of mask sub-patterns, in other words, the mask pattern is formed by the plurality of mask sub-patterns; each mask sub-pattern has a same size as a corresponding target residual block, the mask pattern includes both a first mask point and a second mask point, and the mask pattern obtained in this way is usually an irregular pattern formed by splicing the mask sub-patterns. In a third example, the mask pattern has a same size as the first image, and includes both a first mask point and a second mask point. Generally, the memory in the super-resolution display apparatus stores pattern data in a form of a one-dimensional array, a multi-dimensional array, or the like. If the mask pattern is the mask pattern in the first example, a granularity of data that needs to be stored is a pixel-level data granularity, and storage complexity is relatively high. If the mask pattern is the mask pattern in the second example, a granularity of data that needs to be stored is a pixel-block-level (a size of one pixel block is a size of one mask sub-pattern) data granularity, the stored pattern is more regular that in the first example, and storage complexity is relatively low. If the mask pattern is the mask pattern in the third example, the stored pattern is a rectangle and is more regular than those in the first example and the second example, and storage complexity is relatively low. Therefore, the mask pattern is usually in the shapes described in the second example and the third example.

Step 204: The super-resolution display apparatus performs super-resolution processing on the target pixel region in the first image to obtain a target pixel region after the super-resolution processing.

In some embodiments of this application, the super-resolution display apparatus may perform super-resolution processing on the target pixel region in the first image by using the super-resolution model, to obtain the target pixel region after the super-resolution processing. Refer to step 203. Because the target pixel region may be determined in a plurality of manners, correspondingly, super-resolution processing may be performed in a plurality of manners. In some embodiments of this application, the following two processing manners are used as examples for description.

In a first processing manner, corresponding to the first determining manner in step 203, a process in which the super-resolution display apparatus performs super-resolution processing on the target pixel region in the first image to obtain the target pixel region after the super-resolution processing may be that the super-resolution display apparatus performs super-resolution processing on the target pixel region in the first image by using the super-resolution model, to obtain the target pixel region after the super-resolution processing.

For example, with reference to step 2032, because the super-resolution display apparatus inputs the mask pattern and the first image into the super-resolution model, and determines the target pixel region by using the super-resolution model, the super-resolution display apparatus may continue to perform super-resolution processing on the target pixel region in the first image by using the super-resolution model, to obtain the target pixel region after the super-resolution processing. For a process of performing super-resolution processing by using the super-resolution model, refer to a related technology. Details are not described in this embodiment of this application.

In a second processing manner, corresponding to the second determining manner in step 203, a process in which the super-resolution display apparatus performs super-resolution processing on the target pixel region in the first image to obtain the target pixel region after the super-resolution processing may be that the super-resolution display apparatus inputs the target pixel region in the first image into the super-resolution model, and performs super-resolution processing on the target pixel region in the first image by using the super-resolution model, to obtain the target pixel region after the super-resolution processing.

In some embodiments of this application, a plurality of target image blocks may be selected from the first image to perform super-resolution processing on each target image block. Because super-resolution processing is performed on the target image blocks, and a size of each target image block is smaller than that of the first image, computation complexity of super-resolution processing can be reduced, and computation costs can be reduced. Especially when super-resolution processing is performed by using the super-resolution model, complexity of the super-resolution model can be effectively reduced, and efficiency of super-resolution computation can be improved.

For example, step 204 may include the following steps.

Step B1: The super-resolution display apparatus obtains, from the first image, a target image block corresponding to each mask sub-pattern.

In the first image, an image block corresponding to a location of each mask sub-pattern is determined as a target image block.

Step B2: The super-resolution display apparatus performs super-resolution processing on a sub-region that is of the target pixel region and that is included in each target image block, to obtain the target pixel region after the super-resolution processing.

With reference to the foregoing content, it can be learned that, the mask pattern is used to indicate a location of the target pixel region. Because the mask pattern is divided into a plurality of mask sub-patterns, the target pixel region may also be divided into a plurality of sub-regions corresponding to the plurality of mask sub-patterns. In addition, because each mask sub-pattern corresponds to one target image block, each target image block includes one sub-region of the target pixel region, in other words, the plurality of obtained target image blocks are in a one-to-one correspondence with the plurality of sub-regions. Therefore, the target pixel region obtained after the super-resolution processing includes sub-regions of the target pixel region that are included in all the target image blocks and that are obtained after the super-resolution processing.

For example, super-resolution processing may be performed by using the super-resolution model. Corresponding to the first processing manner in step 204, with reference to step 2032, a region that is in the target pixel region and that corresponds to a target image block, namely, a sub-region that is of the target pixel region and that is included in each target image block, may be first determined by using the super-resolution model, and then super-resolution processing is performed. In this case, step 2032 may include: The super-resolution display apparatus inputs each mask sub-pattern and a corresponding target image block into the super-resolution model (one target image block and one mask sub-pattern corresponding to the target image block are input each time), and determines, by using the super-resolution model, a region that is in the target image block and in which pixels corresponding to locations of a plurality of first mask points in the corresponding mask sub-pattern are located, as a sub-region that is of the target pixel region and that is included in the target image block. Step B2 may include: The super-resolution display apparatus performs, by using the super-resolution model, super-resolution processing on the sub-region that is of the target pixel region and that is included in each target image block, to obtain sub-regions of the target pixel region that are included in all the target image blocks and that are obtained after the super-resolution processing. The target pixel region obtained after the super-resolution processing includes the sub-regions of the target pixel region that are included in all the target image blocks and that are obtained after the super-resolution processing. In this way, a size of an image input into the super-resolution model each time is relatively small, so that computation complexity of the super-resolution model can be effectively reduced. Therefore, super-resolution computation can be implemented by using the super-resolution model with a relatively simple structure, to reduce complexity of the super-resolution model and improve efficiency of super-resolution computation.

Corresponding to the second processing manner in step 204, step B2 may include: The super-resolution display apparatus inputs, into the super-resolution model, a sub-region that is of the target pixel region and that is included in each target image block, and performs, by using the super-resolution model, super-resolution processing on the sub-region that is of the target pixel region and that is included in each target image block, to obtain sub-regions of the target pixel region that are included in all the target image blocks and that are obtained after the super-resolution processing. The target pixel region obtained after the super-resolution processing includes the sub-regions of the target pixel region that are included in all the target image blocks and that are obtained after the super-resolution processing.

After receiving the sub-regions of the target pixel region that are included in all the target image blocks, that are obtained after the super-resolution processing, and that are output from the super-resolution model, the super-resolution display apparatus may perform splicing (which may also be referred to as combination) on the sub-regions based on locations of the target image blocks in the first image to obtain the sub-regions of the target pixel region after the super-resolution processing. In this way, the finally obtained target pixel region after the super-resolution processing includes the sub-regions of the target pixel region that are included in all the target image blocks and that are obtained after the super-resolution processing.

It should be noted that, a quantity of pixels in the target pixel region obtained after the super-resolution processing is greater than a quantity of pixels in the target pixel region before the super-resolution processing, in other words, pixel density of the target pixel region is increased through the super-resolution processing, thereby achieving a super-resolution effect. For example, the target pixel region before the super-resolution processing includes 5×5 pixels, and the target pixel region obtained after the super-resolution processing includes 9×9 pixels.

Step 205: The super-resolution display apparatus determines another pixel region in the first image.

An another (e.g., a second) pixel region includes a pixel region other than the target pixel region. In a first optional manner, the another pixel region is the pixel region in the first image other than the target pixel region (tt can also be understood that step 206 is directly performed without performing the "determining" step). In a second optional manner, the another pixel region is a region that is in the first image and in which a pixel other than a pixel corresponding to the first mask point is located. In a third optional manner, the another pixel region is a region that is in the first image and in which a pixel other than auxiliary pixels is located. A region in which the auxiliary pixels are located includes the target pixel region, but a quantity of auxiliary pixels in the first image is greater than a quantity of pixels (namely, target pixels) in the target pixel region, in other words, an area of the region in which the auxiliary pixels are located is greater than an area of the target pixel region.

When the third optional manner is used, for example, step 205 may include: performing erosion processing on the plurality of first mask points in the mask pattern to obtain an updated mask pattern; determining, as auxiliary pixels, pixels that are in the first image and that correspond to locations of a plurality of first mask points obtained after the erosion processing; and determining, as the another pixel region, a region that is in the first image and in which a pixel other than the auxiliary pixels is located.

The erosion processing is a type of processing for obtaining a local minimum value. Convolution is performed on a to-be-processed image and a preset kernel. In each convolution process, a minimum value in a kernel coverage area is assigned to a specified pixel, and an achieved effect is that a bright region of the to-be-processed image shrinks. The kernel has a definable anchor point, the anchor point is usually a central point of the kernel, and the specified pixel is the anchor point. It should be noted that, there is no inverse relationship between the dilation processing and the erosion processing.

Figure 11:
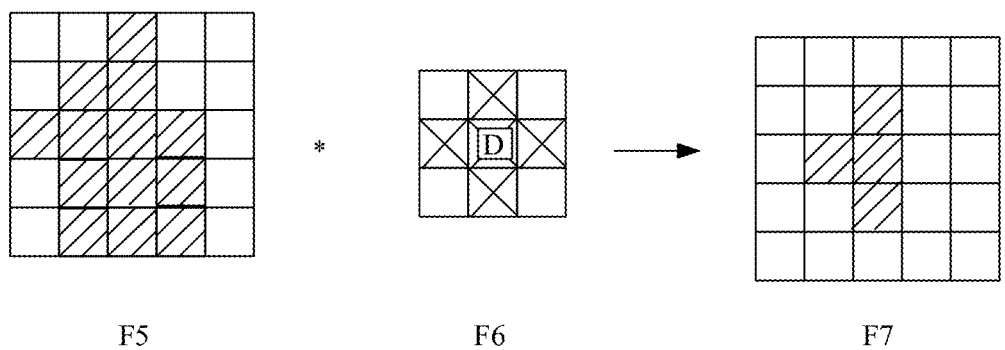
FIG. 11 is a schematic diagram of a principle of erosion processing according to an embodiment of this application.

As shown in FIG. 11, it is assumed in FIG. 11 that a to-be-processed image is F5. The to-be-processed image includes 5×5 pixels, and a shadow part in the image indicates bright spots. A kernel is a shadow part in F6, there are five pixels in total, and an anchor point is a central point D of the five pixels. In this case, a final image obtained after erosion processing is F7. "*" in FIG. 11 represents a convolution operation.

It should be noted that, with reference to FIG. 11, if a mask pattern is F5 and a mask pattern obtained after the erosion processing is F7, mask points corresponding to shadows indicated by oblique lines in F5 and F7 are first mask points.

As described above, the super-resolution model includes at least one convolution kernel. A kernel for the erosion processing has a same size as the receptive field of the last convolutional layer of the super-resolution model. In other words, sizes of the kernel for the erosion processing and the kernel for the dilation processing are the same. A region corresponding to the first mask points in the updated mask pattern obtained in this way is actually a region corresponding to first mask points remained after first mask points at an outermost layer are removed from first mask points in a mask pattern obtained after the dilation processing (in other words, the region corresponding to the first mask points shrinks inward). Compared with the mask pattern obtained after the binarization processing, the updated mask pattern has a smoother edge, and smaller noise is generated.

In some embodiments of this application, marginal noise of the image can be eliminated through erosion processing. The another pixel region is determined by using the updated mask pattern obtained through the erosion processing. Compared with the another pixel region obtained in the foregoing first manners and the another pixel region obtained in the foregoing second optional manners, the another pixel region has a clearer edge, and smaller noise is generated. When a pixel updating process in step 206 is subsequently performed, negative effects such as detail blurring, edge passivation, granular sensation, and noise enhancement can be reduced, thereby ensuring a display effect of a final first image obtained after super-resolution processing.

In some embodiments of this application, during some implementations, another processing manner may be used to update the mask pattern, provided that it is ensured that the region corresponding to the first mask points in the updated mask pattern is the region corresponding to the first mask points remained after the first mask points at the outermost layer are removed from the first mask points in the mask pattern obtained after the dilation processing, that is, an effect that is the same as that of the erosion processing can be achieved. This is not limited in this embodiment of this application.

Step 206: The super-resolution display apparatus updates the another pixel region in the first image by using another pixel region that is in the second image and that is obtained after super-resolution processing.

Because a quantity of pixels in the another pixel region that is in the second image and that is obtained after super-resolution processing is greater than a quantity of pixels in the another pixel region in the first image, a quantity of pixels in updated another pixel region is greater than a quantity of pixels in the another pixel region before updating, in other words, pixel density of the another pixel region is increased through updating processing. A display effect of the updated another pixel region is the same as a display effect of the another pixel region obtained after super-resolution processing. Therefore, the updated another pixel region is equivalent to the another pixel region obtained after super-resolution processing.

Figure 12:
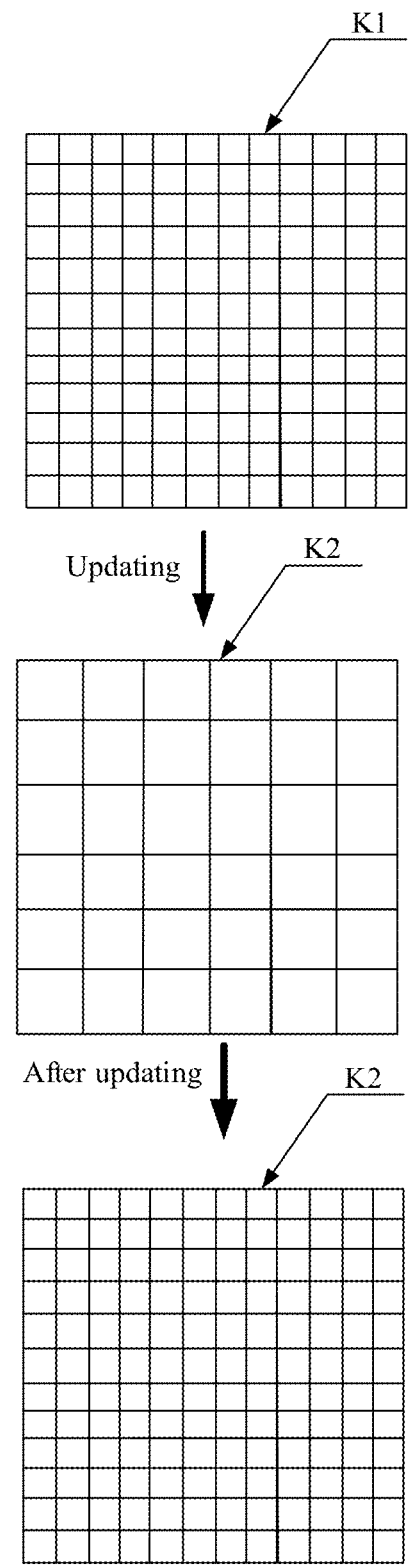
FIG. 12 is a schematic diagram of a principle of updating another pixel region K2 in a first image by using another pixel region K1 that is in a second image and that is obtained after super-resolution processing according to an embodiment of this application.
Figure 15:
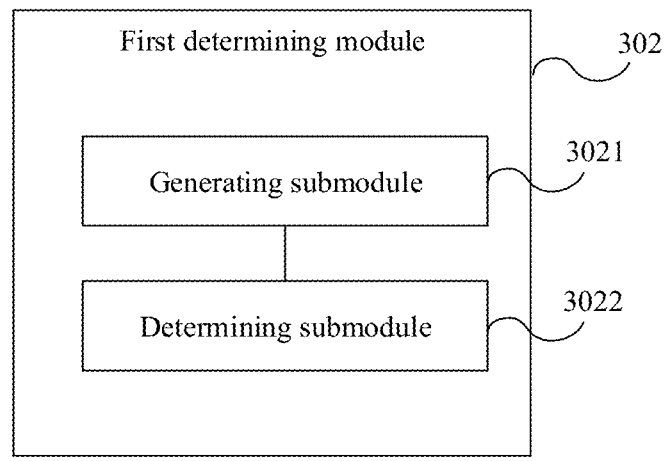
FIG. 15 is a block diagram of a first determining module according to an embodiment of this application.

As shown in FIG. 15, it is assumed that another pixel region K1, that is in the second image and that is obtained after super-resolution processing, includes 12×12 pixels and another pixel region K2 in the first image includes 6×6 pixels. Each box represents one pixel. Sizes of the another pixel region K1 and the another pixel region K2 are the same, and locations of the another pixel region K1 and the another pixel region K2 in the respective images are the same. Updating the another pixel region K2 in the first image by using the another pixel region K1, that is in the second image and that is obtained after super-resolution processing, is updating by using pixel data such as a pixel value and a pixel location of a pixel in the another pixel region K1, pixel data such as a pixel value and a pixel location of a corresponding pixel in the another pixel region K2. In this case, with reference to FIG. 12, a quantity of pixels, pixel values, and pixel locations in updated another pixel region K2 in the first image are correspondingly the same as those in the another pixel region K1 in the second image.

A first image obtained after super-resolution processing, namely, a reconstructed first image, includes the target pixel region obtained after the super-resolution processing in step 204 and the updated another pixel region obtained in step 206. A display effect of the first image obtained after super-resolution processing is the same as that of the first image obtained after conventional super-resolution processing.

Because the another pixel region includes the pixel region in the first image other than the target pixel region, a size of the target pixel region may or may not match a size of the another pixel region. Correspondingly, manners of obtaining the first image after the super-resolution processing are also different. In some embodiments of this application, the following several optional manners are used as examples for description:

In an optional manner, the size of the target pixel region matches the size of the another pixel region, in other words, the another pixel region is the pixel region in the first image other than the target pixel region. Correspondingly, a size of the target pixel region obtained after the super-resolution processing also matches a size of the updated another pixel region. In this case, the first image obtained after super-resolution processing may be obtained by splicing the target pixel region obtained after the super-resolution processing and the updated another pixel region. In another optional manner, the size of the target pixel region does not match the size of the another pixel region, and there is an overlapping region between edges of the target pixel region and the another pixel region. In other words, the another pixel region includes another pixel region in addition to the pixel region in the first image other than the target pixel region. Correspondingly, a size of the target pixel region obtained the after super-resolution processing does not match a size of the updated another pixel region either, and there is an overlapping region between edges of the target pixel region obtained after the super-resolution processing and the updated another pixel region. The another pixel region in the first image is obtained by performing updating by using another pixel region that is in a second image and that is obtained after super-resolution processing, pixel data of a pixel included in the another pixel region in the first image is generally more accurate. Therefore, data of a pixel in the overlapping region in the first image obtained after super-resolution processing is usually based on data of a pixel in the updated another pixel region in the first image. In this case, the first image obtained after super-resolution processing may be obtained by splicing an updated target pixel region and the updated another pixel region. For example, the updated target pixel region is obtained by subtracting (also referred to as removing), from the target pixel region obtained after the super-resolution processing, the overlapping region between the target pixel region obtained after the super-resolution processing and the another pixel region. The updated target pixel region shrinks inward relative to the target pixel region before updating, and a size of the updated target pixel region matches a size of the updated another pixel region.

It should be noted that, in some applications, whether the size of the target pixel region matches the size of the another pixel region may alternatively be not considered, and the first image obtained after super-resolution processing is directly obtained in the following manners:

In an optional manner, the second image obtained after super-resolution processing may be used as a background image, and a corresponding region in the second image is covered by using the target pixel region obtained after the super-resolution processing in step 204, to obtain the first image obtained after super-resolution processing. In another optional manner, the first image or a blank image may be used as a background image, a corresponding region in the first image is covered by using the target pixel region obtained after the super-resolution processing in step 204, and a corresponding region in the first image is covered by using the another pixel region that is in the second image and that is obtained after super-resolution processing, to obtain the first image after super-resolution processing, provided that it is ensured that an effect of the final first image obtained after super-resolution processing is the same as an effect of an image obtained by performing fill super-resolution processing on the first image or a difference between the effects thereof is within an acceptable range. This is not limited in this embodiment of this application.

In some embodiments of this application, a process of generating, based on the target pixel region obtained after the super-resolution processing and the obtained updated another pixel region, the first image after super-resolution processing may alternatively be implemented by using the super-resolution model.

For example, the process of generating the first image after super-resolution processing may satisfy the following formula:

$$R(F(t))=R(F(t-1)(w,h))[Mask(w,h)=R2]+SR(F(t)(w,h))[Mask(w,h)=R1]$$

$R(F(t))$ represents the first image obtained after super-resolution processing. $(w, h)$ represents any point in the image. $Mask(w, h)$ represents a mask point $(w, h)$ in a mask pattern (for example, the updated mask pattern in step 205), and SR represents super-resolution processing. $R(F(t-1)(w, h))[Mask(w, h)=R2]$ represents a pixel region that is in the second image obtained after super-resolution processing and in which a pixel $(w, h)$ corresponding to a mask point $(w, h)$ that is in the mask pattern and whose mask value is a second value is located, that is, the another pixel region determined in step 205. $SR(F(t)(w, h))[Mask(w, h)=R1]$ represents a pixel region that is in a region (namely, the target pixel region determined in step 203) in the first image obtained after super-resolution processing and in which a pixel corresponding to a mask point $(w, h)$ that is in the mask pattern and whose mask value is a first value is located, and this pixel region is the entire region or a partial region of the target pixel region obtained after the super-resolution processing (for example, if an operation of updating the mask pattern in step 205 is not performed, the pixel region is the entire region; or if the operation of updating the mask pattern in step 205 is performed, the pixel region is the partial region). This case is equivalent to that the target pixel region determined in step 203 is updated as the mask pattern is updated, and the partial region is the updated target pixel region. The partial region may be obtained by subtracting, from the target pixel region that is determined in step 203 and that is obtained after the super-resolution processing, an overlapping region between the target pixel region and the another pixel region). R1 represents the first value, and R2 represents the second value. For example, the first value is 1, and the second value is 0. Alternatively, the first value is 255, and the second value is 0.

Step 207: The super-resolution display apparatus updates the first image by using the second image obtained after super-resolution processing.

Because the inter-frame residual corresponding to the residual block is used to reflect the content change between the two adjacent image frames, when residual values of all residual points in the residual block obtained based on the first image and the second image are 0, it indicates that content of the first image and the second image are the same. Similarly, the first image and the second image obtained after super-resolution processing should also be the same. Therefore, the first image is updated by using the second image obtained after super-resolution processing, to obtain the first image after super-resolution processing.

It should be noted that, the second image obtained after super-resolution processing is an image determined by using the image processing method provided in some embodiments of this application, a conventional image processing method, or another super-resolution processing method. The first image is updated by using the second image obtained after super-resolution processing, so that a quantity of pixels in an updated first image may be greater than a quantity of pixels in the first image before updating, in other words, pixel density of the first image is increased through updating processing, thereby achieving a super-resolution effect. Therefore, the updated first image is also a super-resolution image. In other words, the updated first image is equivalent to the first image obtained after super-resolution processing.

It should be noted that, during some implementations of step 203, the super-resolution display apparatus may alternatively calculate a first proportion of a quantity of residual points that are in the residual block and whose residual values are 0 in a total quantity of residual points in the residual block; and when the first proportion is greater than a first super-resolution trigger proportion threshold, determine the target pixel region in the first image based on the residual block: or when the first proportion is not greater than a first super-resolution trigger proportion threshold, perform super-resolution processing on the entire first image in another manner, for example, perform super-resolution processing on the first image in a conventional manner (alternatively, when the first proportion is greater than or equal to a first super-resolution trigger proportion threshold, the super-resolution display apparatus determines the target pixel region in the first image based on the residual block; or when the first proportion is less than a first super-resolution trigger proportion threshold, performs super-resolution processing on the entire first image in another manner).

Whether a content difference between the two adjacent image frames is relatively large may be detected by determining whether the first proportion of the quantity of residual points whose residual values are 0 in the total quantity of residual points in the residual block is greater than the first super-resolution trigger proportion threshold. When the first proportion is not greater than the first super-resolution trigger proportion threshold, it indicates that there are a relatively large content difference and a weak time-domain correlation between the two image frames, and computation costs for directly performing super-resolution processing on the entire first image (for example, directly inputting the first image into the super-resolution model) are less than or equal to computation costs for performing steps 203 to 206. In this case, super-resolution processing may be directly performed on the entire first image. In other words, full super-resolution processing is performed on the first image. When the first proportion is greater than the first super-resolution trigger proportion threshold, it indicates that there is a relatively small content difference between the two image frames, and computation costs for directly performing super-resolution processing on the entire first image are greater than computation costs for performing steps 203 to 206. In this case, steps 203 to 206 may be performed. In this way, whether to perform the partial super-resolution algorithm may be determined based on the content difference between the first image and the second image, thereby improving image processing flexibility.

Similarly, during some implementations of step 203, the super-resolution display apparatus may alternatively calculate a second proportion of a quantity of residual points that are in the residual block and whose residual values are not 0 in a total quantity of residual points in the residual block; and when the second proportion is not greater than a second super-resolution trigger proportion threshold, determine the target pixel region in the first image based on the residual block; or when the second proportion is greater than a second super-resolution trigger proportion threshold, perform super-resolution processing on the entire first image in another manner, for example, perform super-resolution processing on the first image in a conventional manner (alternatively, when the second proportion is greater than a second super-resolution trigger proportion threshold, the super-resolution display apparatus determines the target pixel region in the first image based on the residual block; or when the second proportion is not greater than a second super-resolution trigger proportion threshold, performs super-resolution processing on the entire first image in another manner). Whether a content difference between the two adjacent image frames is relatively large may be detected by determining whether the second proportion is greater than the second super-resolution trigger proportion threshold. When the second proportion is greater than the second super-resolution trigger proportion threshold, it indicates that there are a relatively large content difference and a weak time-domain correlation between the two image frames, and computation costs for directly performing super-resolution processing on the entire first image (for example, directly inputting the first image into the super-resolution model) are less than or equal to computation costs for performing steps 203 to 206. In this case, super-resolution processing may be directly performed on the first image. In other words, full super-resolution processing is performed on the first image. When the second proportion is not greater than the second super-resolution trigger proportion threshold, it indicates that there is a relatively small content difference between the two image frames, and computation costs for directly performing super-resolution processing on the entire first image are greater than computation costs for performing steps 203 to 206. In this case, steps 203 to 206 may be performed. In this way, whether to perform the partial super-resolution algorithm may be determined based on the content difference between the first image and the second image, thereby improving image processing flexibility.

The first super-resolution trigger proportion threshold and the second super-resolution trigger proportion threshold may be the same or different. In an example, both the first super-resolution trigger proportion threshold and the second super-resolution trigger proportion threshold are 50%.

As described above, in some embodiments of this application, an image resolution of an image in the video may be 360p, 480p, 720p, 1080p, 2K, 4K, or the like. In the foregoing embodiments, image resolutions used as examples are all relatively small. For example, it is assumed that the first image and the second image each include 5×5 pixels. This is only for ease of understanding by readers, and an actual resolution of the image is not limited to the resolutions in the foregoing examples.

In the foregoing embodiments, inputting an image or a region in the image into the super-resolution model means inputting pixel data of a pixel in the image or the region in the image into the super-resolution model.

A sequence of the steps of the space communication method provided in the embodiments of this application can be properly adjusted, and the steps can be correspondingly added or deleted based on a situation. Any method that can be easily figured out by a person skilled in the art without departing from a technical scope disclosed in this application shall fall within the protection scope of this application, and therefore details are not described again. Steps 201 to 207 may all be performed under control of the processor shown in FIG. 1.

Figure 13:
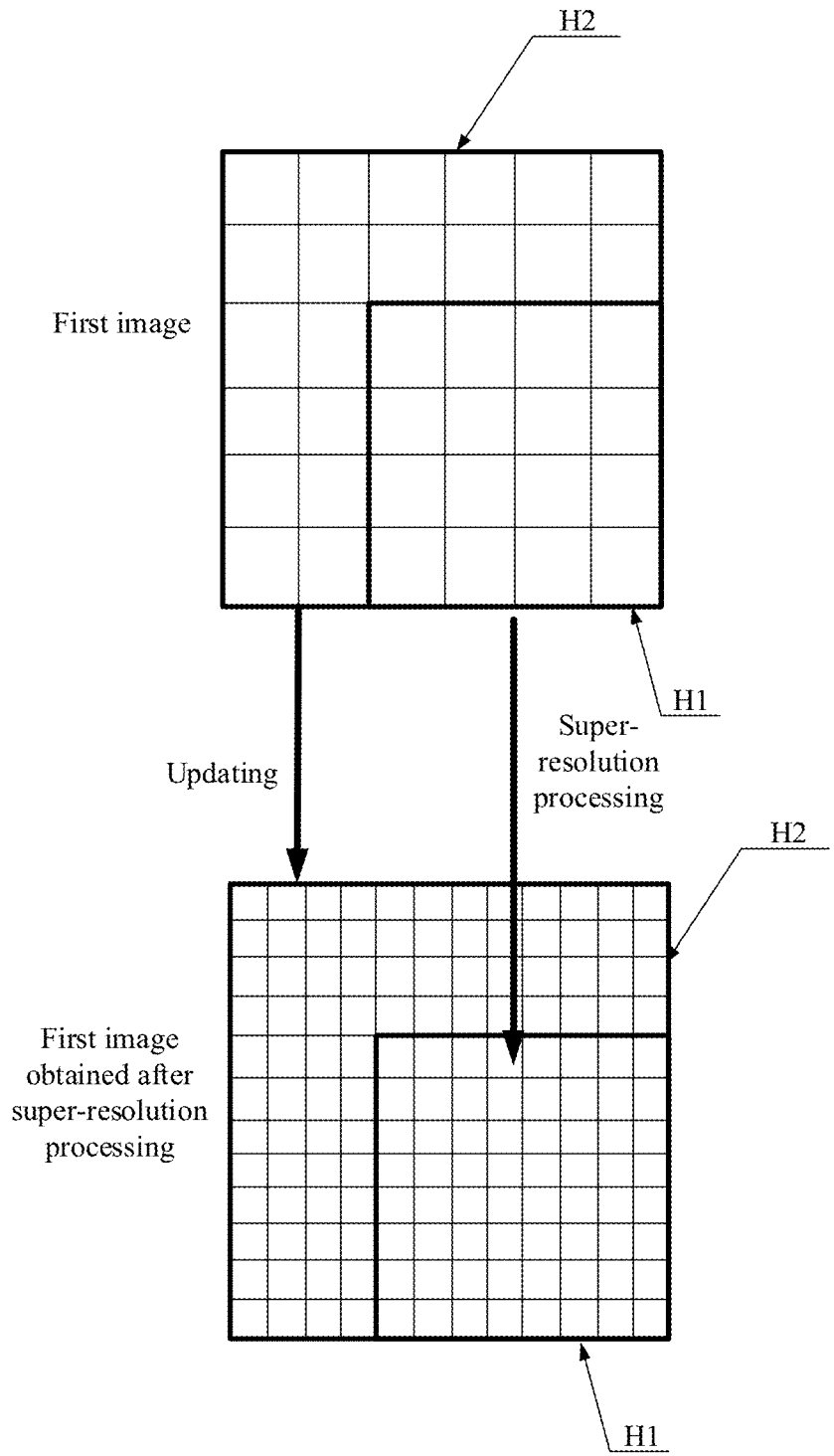
FIG. 13 is a schematic diagram of a principle of an image processing method according to an embodiment of this application.

Refer to FIG. 13. In the partial super-resolution method in some embodiments of this application, the first image is actually divided into a target pixel region H1 and another pixel region H2 for separate processing. During some implementations, there may be an overlapping region between boundaries of the target pixel region H1 determined in step 203 and the another pixel region H2 determined in step 205. In FIG. 13, a description is provided by using an example in which shapes of the target pixel region H1 and the other pixel region H2 match each other and there is no overlapping region between the target pixel region H1 and the other pixel region H2. The target pixel region H1 in the first image is determined, and super-resolution processing is performed on the target pixel region, to implement super-resolution processing on a region in which a pixel that in the first image and that is different from a pixel in the previous image frame is located. In addition, the other pixel region H2 in the first image is updated by using another pixel region that is in the previous image frame and that is obtained after super-resolution processing. This achieves an effect that is the same as that of performing super-resolution processing on the another pixel region, and fully utilizes a characteristic of time-domain redundancy of a video. Therefore, an effect of performing full super-resolution processing on the first image is achieved by performing super-resolution processing on a partial region in the first image, to reduce a computation amount of actual super-resolution processing and reduce computation costs.

Compared with a manner in a conventional technology in which full super-resolution processing is directly performed on a video, processing performed on a test video in some embodiments of this application can reduce approximately 45% of a super-resolution computation amount. In this case, the super-resolution computation amount is significantly reduced. This helps increase a video processing speed and ensures that the video can satisfy a basic frame rate requirement, thereby ensuring real-time performance of the video and preventing a play delay, frame freezing, and the like. In addition, reduction of the computation amount means that a computing unit in the super-resolution display apparatus has fewer processing tasks and lower consumption, so that overall power consumption and electricity consumption of the apparatus are reduced.

In addition, the partial super-resolution algorithm proposed in some embodiments of this application may lead to effect deterioration and in which super-resolution processing is performed on only a part of an image region and the other parts are processed by a non-super-resolution processing means. This method avoids repeated super-resolution processing on an unchanged region and redundant time domain information of adjacent image frames of a video. Essentially, the partial super-resolution algorithm is a method for maximizing information utilization. For the first image on which the partial super-resolution algorithm is executed, the mask pattern is set to guide implementation of super-resolution processing accurate to a pixel level by using the super-resolution model. In a finally processed video, all pixel values of each image frame are essentially from a super-resolution computation result, thereby achieving a same display effect as that achieved by using a conventional full super-resolution algorithm, without reducing the display effect.

In addition, if super-resolution processing is performed by using the super-resolution model in a manner of inputting a mask sub-pattern and a target image block, complexity of super-resolution processing performed each time by using the super-resolution model is relatively low, and a requirement for structural complexity of the super-resolution model is relatively low. This can simplify the super-resolution model, reduce a requirement for processor performance, and improve efficiency of super-resolution processing.

The following are apparatus embodiments of this application, and may be used to perform the method embodiments of this application. For details not disclosed in the apparatus embodiments of this application, refer to the method embodiments of this application.

Figure 14:
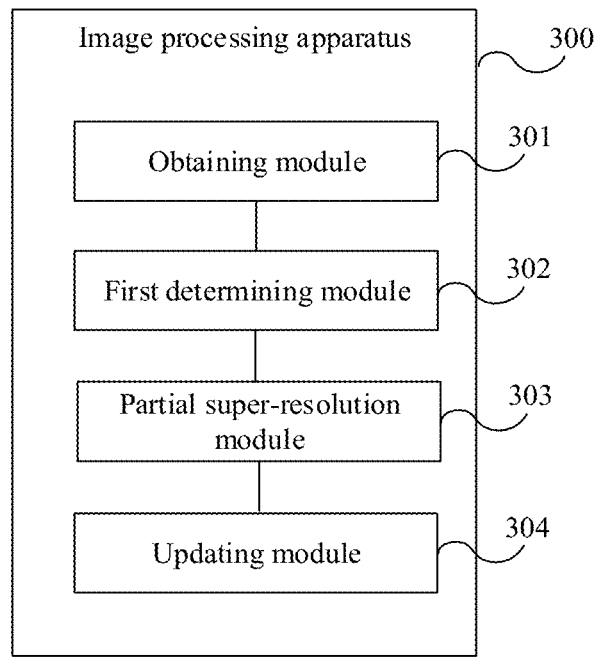
FIG. 14 is a block diagram of an image processing apparatus according to an embodiment of this application.

FIG. 14 is a block diagram of an image processing apparatus 300. The apparatus includes: an obtaining module 301, configured to obtain an inter-frame residual between a first image and a previous image frame adjacent to the first image to obtain a residual block, where the residual block includes a plurality of residual points that are in a one-to-one correspondence with locations of a plurality of pixels in the first image, and each residual point has one residual value; a first determining module 302, configured to determine a target pixel region in the first image based on the residual block; a partial super-resolution module 303, configured to perform super-resolution processing on the target pixel region in the first image to obtain a target pixel region after the super-resolution processing; and an updating module 304, configured to update another pixel region in the first image by using another pixel region that is in the previous image frame and that is obtained after super-resolution processing, where the another pixel region includes a pixel region in the first image other than the target pixel region, and a first image obtained after super-resolution processing includes the target pixel region obtained after the super-resolution processing and updated another pixel region.

Optionally, the target pixel region is a region that is in the first image and in which pixels corresponding to locations of a first target residual point and a second target residual point are located, the first target residual point is a point that is in the residual block and whose residual value is greater than a specified threshold, and the second target residual point is a residual point that is in the residual block and that is around the first target residual point.

In some embodiments of this application, the first determining module determines a target pixel in the first image, and the partial super-resolution module performs super-resolution processing on the target pixel, to implement super-resolution processing on a region in which a pixel that in the first image and that is different from a pixel in the previous image frame is located. In addition, the updating module updates the another pixel region in the first image by using the another pixel region that is in the previous image frame and that is obtained after the super-resolution processing. This fully utilizes a characteristic of time-domain redundancy of a video. Therefore, an effect of performing full super-resolution processing on the first image is achieved by performing super-resolution processing on a partial region in the first image, to reduce a computation amount of super-resolution processing and reduce computation costs.

As shown in FIG. 15, in an optional manner, the first determining module 302 includes: a generating submodule 3021, configured to generate a mask pattern based on the residual block, where the mask pattern includes a plurality of first mask points, and the plurality of first mask points are in a one-to-one correspondence with locations of a plurality of target residual points in the residual block; and a determining submodule 3022, configured to input the mask pattern and the first image into a super-resolution model, and determine, as the target pixel region by using the super-resolution model, a region that is in the first image and in which pixels corresponding to locations of all of the plurality of first mask points are located.

Correspondingly, the partial super-resolution module 303 is configured to perform super-resolution processing on the target pixel region in the first image by using the super-resolution model, to obtain the target pixel region after the super-resolution processing.

In another optional manner, as shown in FIG. 15, the first determining module 302 includes: a generating submodule 3021, configured to generate a mask pattern based on the residual block, where the mask pattern includes a plurality of first mask points, and the plurality of first mask points are in a one-to-one correspondence with locations of a plurality of target residual points in the residual block; and a determining submodule 3022, configured to determine, as the target pixel region, a region that is in the first image and in which pixels corresponding to locations of all of the plurality of first mask points are located.

Correspondingly, the partial super-resolution module 303 is configured to: input a target pixel in the first image into a super-resolution model, and preform super-resolution processing on the target pixel region in the first image by using the super-resolution model, to obtain the target pixel region after the super-resolution processing.

Optionally, the mask pattern includes a plurality of mask points, the plurality of mask points are in a one-to-one correspondence with locations of the plurality of pixels in the first image, each mask point has one mask value, the plurality of mask points include the plurality of first mask points and a plurality of second mask points, a mask value of the first mask point is a first value, a mask value of the second mask point is a second value, and the first value is different from the second value.

In the two foregoing optional manners, both the determining submodules 3022 may be configured to: traverse mask points in the mask pattern, and determine, in the first image, a pixel corresponding to a mask point whose mask value is the first value as the target pixel.

Optionally, the generating submodule 3021 is configured to: perform morphological transformation processing on the residual block to obtain the mask pattern, where the morphological transformation processing includes binarization processing and dilation processing that is performed on a first mask point in a residual block obtained after the binarization, the super-resolution model includes at least one convolutional layer, and a kernel for the dilation processing has a same size as a receptive field of the last convolutional layer of the super-resolution model.

Optionally, the generating submodule 3021 is configured to: divide the residual block into a plurality of residual sub-blocks, and perform block division processing on each residual sub-block obtained through the division, where the block division processing includes: when a residual value of at least one residual point included in the residual sub-block is not 0, divide the residual sub-block into a plurality of residual sub-blocks, and preform block division processing on each residual sub-block obtained through the division, until residual values of all residual points included in a residual sub-block obtained through the division are 0, a total quantity of residual points in a residual sub-block obtained through the division is less than a point quantity threshold, or a total quantity of times for dividing the residual block reaches a quantity of times threshold; and generate a mask sub-pattern corresponding to each target residual block, where a residual value of at least one residual point included in the target residual block is not 0, and the mask pattern includes the generated mask sub-pattern.

Optionally, the partial super-resolution module 303 is configured to: obtain, from the first image, a target image block corresponding to each mask sub-pattern; and perform super-resolution processing on a sub-region that is of the target pixel region and that is included in each target image block, to obtain the target pixel region after the super-resolution processing, where the target pixel region obtained after the super-resolution processing includes sub-regions of the target pixel region that are included in all the target image blocks and that are obtained after the super-resolution processing.

Optionally, block division is performed on both the residual block and the residual sub-block in a quadtree division manner.

Figure 16:
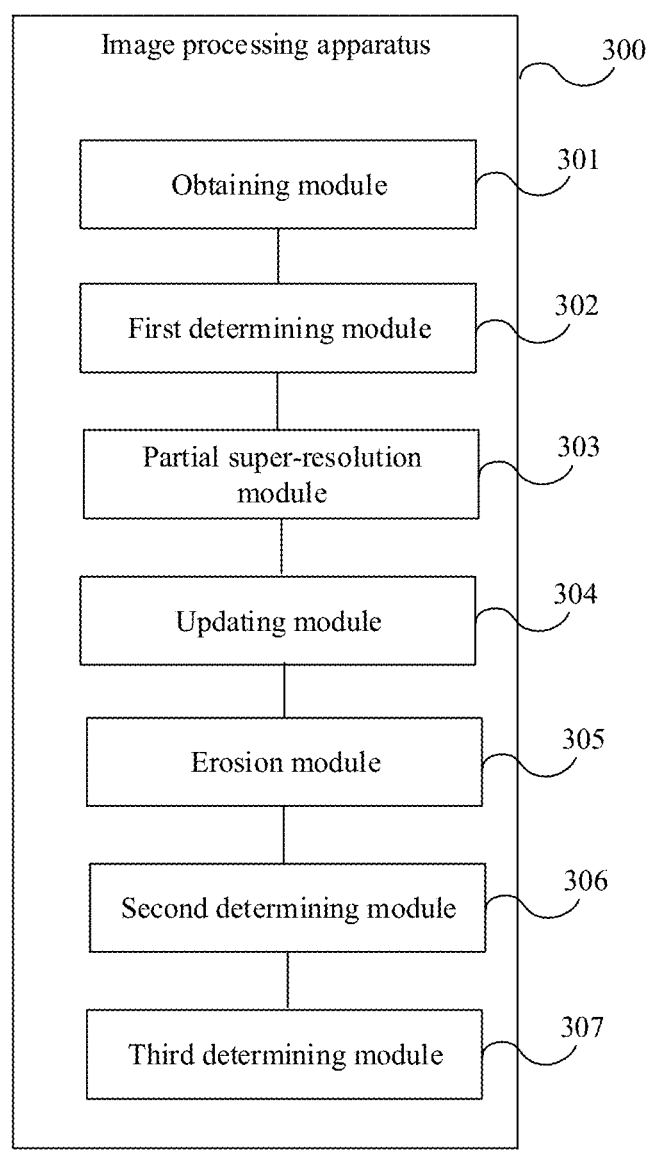
FIG. 16 is a block diagram of another image processing apparatus according to an embodiment of this application.

Optionally, as shown in FIG. 16, the apparatus 300 further includes: an erosion module 305, configured to: before a pixel value corresponding to the another pixel region in the first image is updated by using a pixel value of a pixel that is in the previous image frame and that corresponds to a location in the another pixel region, perform erosion processing on the plurality of first mask points in the mask pattern to obtain an updated mask pattern, where a kernel for the erosion processing has a same size as the receptive field of the last convolutional layer of the super-resolution model;

a second determining module 306, configured to determine, as auxiliary pixels, pixels that are in the first image and that correspond to locations of a plurality of first mask points obtained after the erosion processing; and a third determining module 307, configured to determine, as the another pixel region, a region that is in the first image and in which a pixel other than the auxiliary pixels is located.

Optionally, the first determining module 302 is further configured to: calculate a first proportion of a quantity of residual points that are in the residual block and whose residual values are 0 in a total quantity of residual points in the residual block; and when the first proportion is greater than a first super-resolution trigger proportion threshold, determine the target pixel region in the first image based on the residual block.

Optionally, the super-resolution model may be a CNN model, for example, an SRCNN model or an ESPCN model, or the super-resolution model may be a GAN model, for example, an SRGAN model or an ESRGAN model.

In some embodiments of this application, the first determining module determines a target pixel in the first image, and the partial super-resolution module performs super-resolution processing on the target pixel, to implement super-resolution processing on a region in which a pixel that in the first image and that is different from a pixel in the previous image frame is located. In addition, the updating module updates the another pixel region in the first image by using the another pixel region that is in the previous image frame and that is obtained after the super-resolution processing. This fully utilizes a characteristic of time-domain redundancy of a video. Therefore, an effect of performing full super-resolution processing on the first image is achieved by performing super-resolution processing on a partial region in the first image, to reduce a computation amount of super-resolution processing and reduce computation costs.

It may be clearly understood by a person skilled in the art that, for the purpose of convenient and brief description, for a detailed working process of the foregoing apparatus and module, refer to a corresponding process in the foregoing method embodiments, and details are not described herein again.

In addition, the modules in the foregoing apparatus may be implemented by software, or a combination of software and hardware. When at least one module is hardware, the hardware may be an integrated logic circuit module, and may include a transistor, a logic gate array, an algorithm logic circuit, or the like. When at least one module is software, the software exists in a form of a computer program product, and is stored in a computer readable storage medium. The software may be executed by a processor. Therefore, alternatively, the image processing apparatus may be implemented by a processor by executing a software program. This is not limited in this embodiment.

Some embodiments of this application provides an electronic device, including a processor and a memory, where the memory is configured to store a computer program, and the processor is configured to implement any image processing method in this application when executing the computer program stored in the memory.

Figure 17:
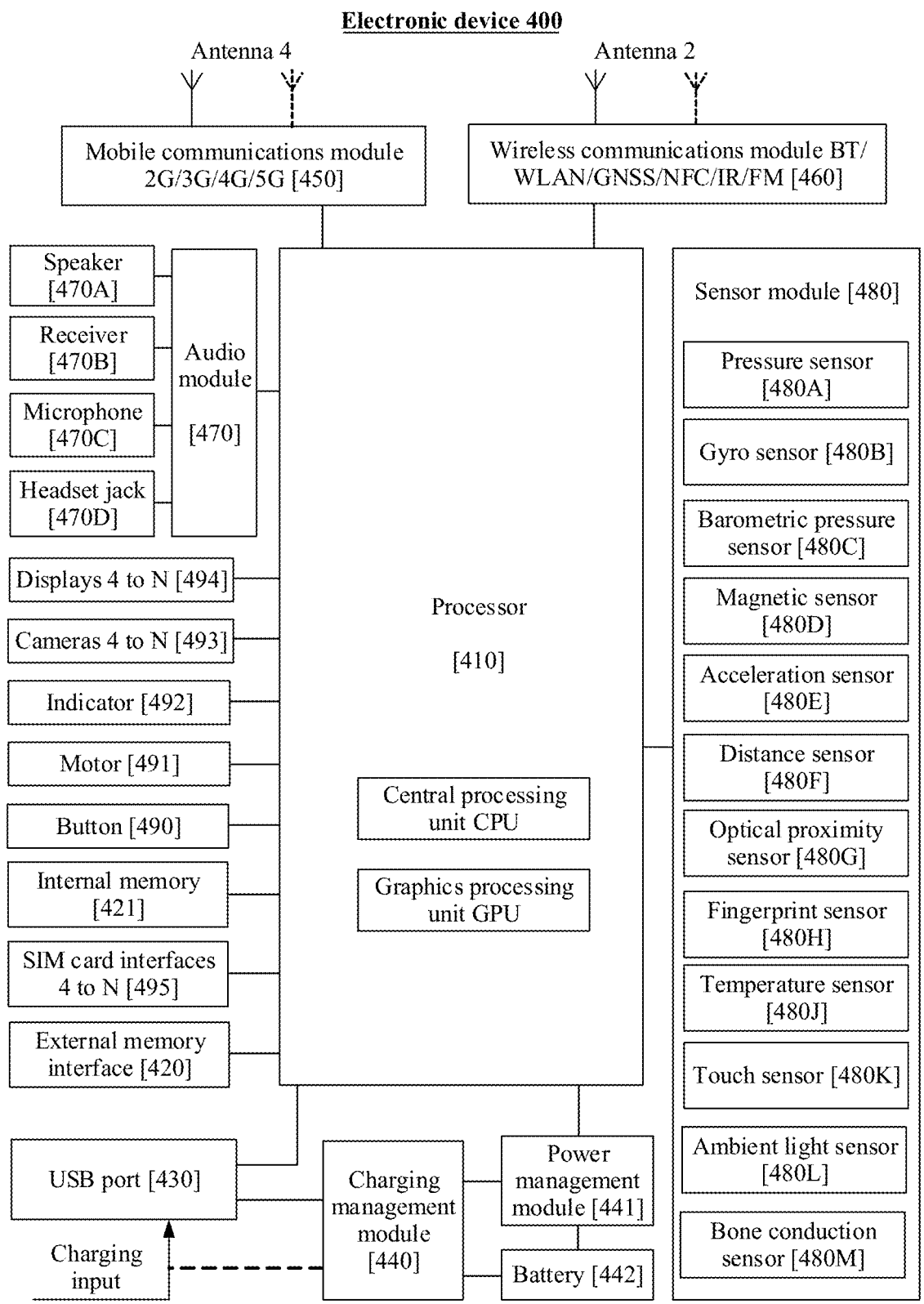
FIG. 17 is a block diagram of an electronic device according to an embodiment of this application.

FIG. 17 is a schematic diagram of a structure of an electronic device 400 used in an image processing method. The electronic device 400 may be, but is not limited to, a laptop computer, a desktop computer, a mobile phone, a smartphone, a tablet computer, a multimedia player, an e-reader, a smart vehicle-mounted device, a smart household appliance (for example, a smart television), an artificial intelligence (AI) device, a wearable device, an internet of things (IoT) device, a virtual reality (VR)device/an augmented reality (AR) device/a hybrid reality device, or the like. For example, the electronic device 400 may include the structure of the super-resolution display apparatus 100 shown in FIG. 1.

The electronic device 400 may include a processor 410, an external memory interface 420, an internal memory 421, a universal serial bus (USB) interface 430, a charging management module 440, a power management module 441, a battery 442, an antenna 4, an antenna 2, a mobile communications module 450, a wireless communications module 460, an audio module 470, a speaker 470A, a receiver 470B, a microphone 470C, a headset jack 470D, a sensor module 480, a button 490, a motor 491, an indicator 492, a camera 493, a display 494, a subscriber identity module (SIM) card interface 495, and the like. The sensor module 480 may include one or more of a pressure sensor 480A, a gyroscope sensor 480B, a barometric pressure sensor 480C, a magnetic sensor 480D, an acceleration sensor 480E, a distance sensor 480F, an optical proximity sensor 480G, a fingerprint sensor 480H, a temperature sensor 480J, a touch sensor 480K, an ambient light sensor 480L, and a bone conduction sensor 480M.

It may be understood that the structure shown in the embodiments of this application does not constitute a specific limitation on the electronic device 400. In some other embodiments of this application, the electronic device 400 may include more or fewer components than those shown in the figure, combine some components, split some components, or have different component arrangements. The components shown in the figure may be implemented by hardware, software, or a combination of software and hardware.

It may be understood that an interface connection relationship between modules illustrated in some embodiments of this application is merely an example for description, and does not constitute a limitation on the structure of the electronic device 400. In some other embodiments of this application, the electronic device 400 may alternatively use an interface connection manner (for example, a bus connection manner) that is different from that in the foregoing embodiment, or a combination of a plurality of interface connection manners.

The processor 410 may include one or more processing units, for example, include a central processing unit CPU (for example, an application processor (AP)) and a GPU. Further, the processor 410 may further include a modem processor, an image signal processor (ISP), a MCU, a video codec, a digital signal processor (DSP), a baseband processor, a neural-network processing unit (NPU), and/or the like. Different processing units may be independent components, or may be integrated into one or more processors.

A memory may be further disposed in the processor 410, and is configured to store instructions and data. In some embodiments, the memory in the processor 410 is a cache memory. The memory may store instructions or data just used or cyclically used by the processor 410. If the processor 410 needs to use the instructions or the data again, the processor 410 may directly invoke the instructions or the data from the memory, to avoid repeated access and reduce a waiting time of the processor 410, thereby improving system efficiency.

In some embodiments, the processor 410 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus USB interface, and/or the like.

The I2C interface is a two-way synchronization serial bus, and includes one serial data line (SDA) and one serial clock line (SCL). In some embodiments, the processor 410 may include a plurality of groups of I2C buses. The processor 410 may be separately coupled to the touch sensor 480K, a charger, a flashlight, the camera 493, and the like through different I2C bus interfaces. For example, the processor 410 may be coupled to the touch sensor 480K through the I2C interface, so that the processor 410 communicates with the touch sensor 480K through the I2C bus interface, to implement a touch function of the electronic device 400.

The US interface may be configured to perform audio communication. In some embodiments, the processor 410 may include a plurality of groups of 2S buses. The processor 410 may be coupled to the audio module 470 through the I2S bus, to implement communication between the processor 410 and the audio module 470. In some embodiments, the audio module 470 may transmit an audio signal to the wireless communications module 460 through the I2S interface, to implement a function of answering a call through a Bluetooth headset.

The PCM interface may also be configured to perform audio communication, and sample, quantize, and code an analog signal. In some embodiments, the audio module 470 may be coupled to the wireless communications module 460 through a PCM bus interface. In some embodiments, the audio module 470 may alternatively transmit an audio signal to the wireless communications module 460 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 410 to the wireless communications module 460. For example, the processor 410 communicates with a Bluetooth module in the wireless communications module 460 through the UART interface, to implement a Bluetooth function. In some embodiments, the audio module 470 may transmit an audio signal to the wireless communications module 460 through the UART interface, to implement a function of playing music through the Bluetooth headset.

The MIPI interface may be configured to connect the processor 410 to a peripheral component such as the display 494 or the camera 493. The MIPI interface includes a camera serial interface (CSI), a display serial interface (DSI), or the like. In some embodiments, the processor 410 communicates with the camera 493 through the CSI interface, to implement a photographing function of the electronic device 400. The processor 410 communicates with the display 494 through the DSI interface, to implement a display function of the electronic device 400.

The GPIO interface may be configured by using software. The GPIO interface may be configured as a control signal, or may be configured as a data signal. In some embodiments, the GPIO interface may be configured to connect the processor 410 to the camera 493, the display 494, the wireless communications module 460, the audio module 470, the sensor module 480, or the like. The GPIO interface may be further configured as the I2C interface, the I2S interface, the UART interface, the MIPI interface, or the like.

The USB port 430 is an interface that conforms to a USB standard specification, and may be a mini USB port, a micro USB port, a USB Type C interface, or the like. The USB port 430 may be used to connect to a charger for charging the electronic device 400, may be used to transmit data between the electronic device 400 and a peripheral device, or may also be configured to connect to a headset to play audio through the headset. Alternatively, the port may be used to connect to another electronic device, for example, an AR device.

The charging management module 440 is configured to receive a charging input from the charger. The charger may be a wireless charger or a wired charger. In some embodiments of wired charging, the charging management module 440 may receive a charging input of the wired charger through the USB port 430. In some embodiments of wireless charging, the charging management module 440 may receive a wireless charging input through a wireless charging coil of the electronic device 400. The charging management module 440 may further supply power to the electronic device by using the power management module 441 while charging the battery 442.

The power management module 441 is configured to connect to the battery 442, the charging management module 440, and the processor 410. The power management module 441 receives an input of the battery 442 and/or an input of the charging management module 440, and supplies power to the processor 410, the internal memory 421, the display 494, the camera 493, the wireless communications module 460, and the like. The power management module 441 may be further configured to monitor parameters such as a battery capacity, a battery cycle count, and a battery health status (electric leakage or impedance). In some other embodiments, the power management module 441 may alternatively be disposed in the processor 410. In some other embodiments, the power management module 441 and the charging management module 440 may alternatively be disposed in a same device.

Optionally, a wireless communication function of the electronic device 400 may be implemented through the antenna 4, the antenna 2, the mobile communications module 450, the wireless communications module 460, the modem processor, the baseband processor, and the like.

The antenna 4 and the antenna 2 are configured to transmit and receive electromagnetic wave signals. Each antenna in the electronic device 400 may be configured to cover one or more communication bands. Different antennas may be further multiplexed, to improve antenna utilization. For example, the antenna 4 may be multiplexed as a diversity antenna in a wireless local area network. In some other embodiments, an antenna may be used in combination with a tuning switch.

The mobile communications module 450 may provide a wireless communication solution that includes second generation (2G)/third generation (3G)/fourth generation (4G)/fifth generation (5G) or the like and that is applied to the electronic device 400. The mobile communications module 450 may include at least one filter, a switch, a power amplifier, a low noise amplifier (LNA), and the like. The mobile communications module 450 may receive an electromagnetic wave through the antenna 4, perform processing such as filtering and amplification on the received electromagnetic wave, and transfer a processed electromagnetic wave to the modem processor for demodulation. The mobile communications module 450 may further amplify a signal modulated by the modem processor, and convert the signal into an electromagnetic wave for radiation through the antenna 4. In some embodiments, at least some function modules in the mobile communications module 450 may be disposed in the processor 410. In some embodiments, at least some function modules in the mobile communications module 450 and at least some modules in the processor 410 may be disposed in a same device.

The modem processor may include a modulator and a demodulator. The modulator is configured to modulate a to-be-sent low frequency baseband signal into a medium and high frequency signal. The demodulator is configured to demodulate a received electromagnetic wave signal into a low frequency baseband signal. Then, the demodulator transmits the low frequency baseband signal obtained through demodulation to the baseband processor for processing. After being processed by the baseband processor, the low frequency baseband signal is transmitted to the application processor. The application processor outputs a sound signal through an audio device (which is not limited to the speaker 470A, the receiver 470B, or the like), or displays an image or a video through the display 494. In some embodiments, the modem processor may be an independent device. In some other embodiments, the modem processor may be independent of the processor 410, and is disposed in the same device as the mobile communications module 450 or another function module.

The wireless communications module 460 may provide a wireless communication solution that includes a wireless local area network (WLAN)(for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 400. The wireless communications module 460 may be one or more components that integrate at least one communications processing module. The wireless communications module 460 receives an electromagnetic wave through the antenna 2, performs frequency modulation and filtering processing on the electromagnetic wave signal, and sends a processed signal to the processor 410. The wireless communications module 460 may further receive a to-be-sent signal from the processor 410, perform frequency modulation and amplification on the signal, and convert the signal into an electromagnetic wave for radiation through the antenna 2.

In some embodiments, in the electronic device 400, the antenna 4 and the mobile communications module 450 are coupled, and the antenna 2 and the wireless communications module 460 are coupled, so that the electronic device 400 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE). BT, a GNSS, a WLAN, NFC, FM, an IR technology, and/or the like. The GNSS may include a global positioning system(GPS), a global navigation satellite system(GLONASS), a BeiDou navigation satellite system (BDS), a quasi-zenith satellite system (QZSS), and/or a satellite based augmentation system (SBAS).

The electronic device 400 implements a display function by using the GPU, the display 494, the application processor, and the like. The GPU is a microprocessor for image processing, and is connected to the display 494 and the application processor. The GPU is configured to perform mathematical and geometric calculation, and render an image. The processor 410 may include one or more GPUs that execute program instructions to generate or change display information.

The display 494 is configured to display an image, a video, and the like. The display 494 includes a display panel. The display panel may be a liquid crystal display (LCD), an organic light-emitting diode (OLED), an active-matrix organic light emitting diode (AMOLED), a flexible light-emitting diode (FLED), a mini light emitting diode (LED), a micro LED, a micro-OLED, a quantum dot light emitting diode (QLED), or the like. In some embodiments, the electronic device 400 may include 4 or N displays 494, where N is a positive integer greater than 4.

The electronic device 400 can implement a photographing function by using the ISP, the camera 493, the video codec, the GPU, the display 494, the application processor, and the like.

The ISP is configured to process data fed back by the camera 493. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 493.

The camera 493 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 400 may include 4 or N cameras 493, where N is a positive integer greater than 4.

The digital signal processor is configured to process a digital signal, and may process another digital signal in addition to the digital image signal. For example, when the electronic device 400 selects a frequency, the digital signal processor is configured to perform Fourier transformation and the like on frequency energy.

The video codec is configured to compress or decompress a digital video. The electronic device 400 may support one or more video codecs. Therefore, the electronic device 400 may play or record videos in a plurality of coding formats, for example, moving picture experts group (MPEG)-4, MPEG-2, MPEG-3, and MPEG-4.

The NPU is a neural network (NN) computing processor that rapidly processes input information by referring to a structure of a biological neural network, for example, by referring to a transfer mode between human brain neurons, and can further perform self-learning continuously. The NPU can implement applications such as intelligent cognition of the electronic device 400, such as image recognition, facial recognition, speech recognition, and text understanding.

The external memory interface 420 may be configured to connect to an external memory card, for example, a micro SD card, to extend a storage capability of the electronic device 400. The external storage card communicates with the processor 410 through the external memory interface 420, to implement a data storage function. For example, files such as music and videos are stored in the external storage card.

The internal memory 421 may be configured to store computer-executable program code. The executable program code includes instructions. The internal memory 421 may include a program storage area and a data storage area. The program storage area may store an operating system (OS), an application required by at least one function (for example, a sound playing function or an image playing function), and the like. The data storage area may store data (for example, audio data, and an address book) created in a process of using the electronic device 400, and the like. In addition, the internal memory 421 may include a high-speed random access memory, for example, a double data rate synchronous dynamic random access memory (DDR), and may alternatively include a non-volatile memory, for example, at least one magnetic disk storage device, a flash memory device, or a universal flash storage (UFS). The processor 410 runs the instructions stored in the internal memory 421 and/or the instructions stored in the memory disposed in the processor, to perform various function applications of the electronic device 400 and data processing.

The electronic device 400 may implement an audio function such as music playing or recording by using the audio module 470, the speaker 470A, the receiver 470B, the microphone 470C, the headset jack 470D, the application processor, and the like.

The audio module 470 is configured to convert digital audio information into an analog audio signal for output, and is also configured to convert an analog audio input into a digital audio signal. The audio module 470 may be further configured to code and decode an audio signal. In some embodiments, the audio module 470 may be disposed in the processor 410, or some function modules of the audio module 470 are disposed in the processor 410.

The speaker 470A, also referred to as a "loudspeaker", is configured to convert an audio electrical signal into a sound signal. The electronic device 400 may be used to listen to music or answer a call in a hands-free mode through the speaker 470A.

The receiver 470B, also referred to as an "earpiece", is configured to convert an audio electrical signal into a sound signal. When a call is answered or audio information is listened to by using the electronic device 400, the receiver 470B may be put close to a human ear to listen to a voice.

The microphone 470C, also referred to as a "mike" or a "mic", is configured to convert a sound signal into an electrical signal. When making a call or sending voice information, a user may make a sound by moving a human mouth close to the microphone 470C to input a sound signal to the microphone 470C. At least one microphone 470C may be disposed in the electronic device 400. In some other embodiments, two microphones 470C may be disposed in the electronic device 400, to collect a sound signal and implement a noise reduction function. In some other embodiments, three, four, or more microphones 470C may alternatively be disposed in the electronic device 400, to collect a sound signal, implement noise reduction, and identify a sound source, so as to implement a directional recording function and the like.

The headset jack 470D is configured to connect to a wired headset. The headset jack 470D may be the USB port 430, or may be a 3.5 mm open mobile terminal platform (OMTP) standard interface or a cellular telecommunications industry association of the USA (CTIA) standard interface.

The pressure sensor 480A is configured to sense a pressure signal, and can convert the pressure signal into an electrical signal. In some embodiments, the pressure sensor 480A may be disposed on the display 494. There are many types of pressure sensors 480A, such as a resistive pressure sensor, an inductive pressure sensor, and a capacitive pressure sensor. The capacitive pressure sensor may include at least two parallel plates made of conductive materials. When a force is applied to the pressure sensor 480A, capacitance between electrodes changes. The electronic device 400 determines pressure intensity based on a capacitance change. When a touch operation is performed on the display 494, the electronic device 400 detects intensity of the touch operation by using the pressure sensor 480A. The electronic device 400 may calculate a touch location based on a detection signal of the pressure sensor 480A. In some embodiments, touch operations that are performed at a same touch location but have different touch operation intensity may correspond to different operation instructions. For example, when a touch operation whose touch operation intensity is less than a first pressure threshold is performed on an application icon "Messages", an instruction for viewing a short message service (SMS) message is executed. When a touch operation whose touch operation intensity is greater than or equal to the first pressure threshold is performed on an application icon "Messages", an instruction for creating an SMS message is executed.

The gyroscope sensor 480B may be configured to determine a motion posture of the electronic device 400. In some embodiments, an angular velocity of the electronic device 400 around three axes (namely, axes x, y, and z) may be determined by using the gyroscope sensor 480B. The gyroscope sensor 480B may be configured to implement image stabilization during photographing. For example, when a shutter is pressed, the gyroscope sensor 480B detects an angle at which the electronic device 400 jitters, obtains, through calculation based on the angle, a distance for which a lens module needs to compensate, and allows the lens to cancel the jitter of the electronic device 400 through reverse motion, to implement image stabilization. The gyroscope sensor 480B may be further used in a navigation scenario and a motion-sensing game scenario.

The barometric pressure sensor 480C is configured to measure barometric pressure. In some embodiments, the electronic device 400 calculates an altitude based on a barometric pressure value measured by the barometric pressure sensor 480C, to assist in positioning and navigation.

The magnetic sensor 480D includes a Hall effect sensor. The electronic device 400 may detect opening and closing of a flip cover by using the magnetic sensor 480D. In some embodiments, when the electronic device 400 is a clamshell phone, the electronic device 400 may detect opening and closing of a flip cover by using the magnetic sensor 480D. Further, a feature such as automatic unlocking upon opening of the flip cover is set based on a detected opening or closing state of the leather case or a detected opening or closing state of the flip cover.

The acceleration sensor 480E may detect magnitude of accelerations in various directions (usually on three axes) of the electronic device 400, and may detect magnitude and a direction of gravity when the electronic device 400 is still. The acceleration sensor 180E may be further configured to recognize a posture of the electronic device, and is used in screen switching between a landscape mode and a portrait mode, a pedometer, or another application.

The distance sensor 480F is configured to measure a distance. The electronic device 400 may measure the distance in an infrared or a laser manner. In some embodiments, in a photographing scenario, the electronic device 400 may measure a distance by using the distance sensor 480F to implement quick focusing.

The optical proximity sensor 480G may include, for example, a LED and an optical detector such as a photodiode. The light-emitting diode may be an infrared light-emitting diode. The electronic device 400 emits infrared light by using the light-emitting diode. The electronic device 400 detects infrared reflected light from a nearby object by using the photodiode. When sufficient reflected light is detected, the electronic device 400 may determine that there is an object near the electronic device 400. When insufficient reflected light is detected, the electronic device 400 may determine that there is no object near the electronic device 400. The electronic device 400 may detect, by using the optical proximity sensor 480G, that a user holds the electronic device 400 close to an ear for a call, to automatically turn off a screen for power saving. The optical proximity sensor 480G may also be used in a leather case mode or a pocket mode to automatically unlock or lock the screen.

The ambient light sensor 480L is configured to sense ambient light brightness. The electronic device 400 may adaptively adjust brightness of the display 494 based on the sensed ambient light brightness. The ambient light sensor 480L may also be configured to automatically adjust a white balance during photographing. The ambient light sensor 480L may further cooperate with the optical proximity sensor 480G to detect whether the electronic device 400 is in a pocket, to prevent an accidental touch.

The fingerprint sensor 480H is configured to collect a fingerprint. The electronic device 400 may use a feature of the collected fingerprint to implement fingerprint-based unlocking application lock access, fingerprint-based photographing, fingerprint-based call answering, and the like.

The temperature sensor 480J is configured to detect a temperature. In some embodiments, the electronic device 400 executes a temperature processing policy based on the temperature detected by the temperature sensor 480J. For example, when the temperature reported by the temperature sensor 480J exceeds a threshold, the electronic device 400 lowers performance of a processor located near the temperature sensor 480J, to reduce power consumption to implement thermal protection. In some other embodiments, when the temperature is less than another threshold, the electronic device 400 heats the battery 442 to prevent the electronic device 400 from being shut down abnormally due to a low temperature. In some other embodiments, when the temperature is less than still another threshold, the electronic device 400 boosts an output voltage of the battery 442, to avoid abnormal shutdown due to a low temperature.

The touch sensor 480K is also referred to as a "touch control device". The touch sensor 480K may be disposed on the display 494, and the touch sensor 480K and the display 494 form a touchscreen, which is also referred to as a "touch screen". The touch sensor 480K is configured to detect a touch operation performed on or near the touch sensor 480K. The touch sensor may transfer the detected touch operation to the application processor, to determine a type of a touch event. Visual output related to the touch operation may be provided on the display 494. In some other embodiments, the touch sensor 480K may alternatively be disposed on a surface of the electronic device 400 at a location different from a location of the display 494.

The bone conduction sensor 480M may obtain a vibration signal. In some embodiments, the bone conduction sensor 480M may obtain a vibration signal of a vibration bone of a human vocal-cord part. The bone conduction sensor 480M may also be in contact with a human pulse, to receive a blood pressure beating signal. In some embodiments, the bone conduction sensor 480M may alternatively be disposed in a headset to form a bone conduction headset. The audio module 470 may obtain a voice signal through parsing based on the vibration signal that is of the vibration bone of the vocal-cord part and that is obtained by the bone conduction sensor 480M, to implement a voice function. The application processor may parse heart rate information based on the blood pressure beating signal obtained by the bone conduction sensor 480M, to implement a heart rate detection function.

In some other embodiments of this application, the electronic device 400 may alternatively use an interface connection manner that is different from that in the foregoing embodiments. For example, a part or all of the foregoing plurality of sensors are connected to the MCU, and then connected to the AP through the MCU.

The button 490 includes a power button, a volume button, and the like. The button 490 may be a mechanical button, or may be a touch button. The electronic device 400 may receive a button input, and generate a button signal input related to a user setting and function control of the electronic device 400.

The motor 491 may generate a vibration prompt. The motor 491 may be configured to produce an incoming call vibration prompt and a touch vibration feedback. For example, touch operations performed on different applications (for example, photographing and audio playing) may correspond to different vibration feedback effects. The motor 491 may also correspond to different vibration feedback effects for touch operations performed on different areas of the display 494. Different application scenarios (for example, a time reminder, information receiving, an alarm clock, and a game) may also correspond to different vibration feedback effects. A touch vibration feedback effect may be further customized.

The indicator 492 may be an indicator light, and may be configured to indicate a charging status and a power change, or may be configured to indicate a message, a missed call, a notification, and the like.

The SIM card interface 495 is configured to connect to a SIM card. The SIM card may be inserted into the SIM card interface 495 or removed from the SIM card interface 495, to implement contact with or separation from the electronic device 400. The electronic device 400 may support 4 or N SIM card interfaces, where N is a positive integer greater than 4. The SI card interface 495 can support a nano-SIM card, a micro-SIM card, a SI card, and the like. A plurality of cards may be simultaneously inserted into a same SIM card interface 495. The plurality of cards may be of a same type or of different types. The SI card interface 495 may be compatible with different types of SI cards. The SI card interface 495 may also be compatible with an external storage card. The electronic device 400 interacts with a network through the SIM card, to implement functions such as calling and data communication. In some embodiments, the electronic device 400 uses an eSIM, namely, an embedded SI card. The eSIM card may be embedded in the electronic device 400, and cannot be separated from the electronic device 400.

A software system of the electronic device 400 may use a layered architecture, an event-driven architecture, a microkernel architecture, a micro service architecture, or a cloud architecture. In the embodiments of this application, an Android system with a layered architecture is used as an example to describe a software structure of the electronic device 400.

An embodiment of this application further provides an image processing apparatus, including a processor and a memory. When the processor executes a computer program stored in the memory, the image processing apparatus performs the image processing method provided in the embodiments of this application. Optionally, the image processing apparatus may be deployed in a smart television.

An embodiment of this application further provides a storage medium. The storage medium may be a non-volatile computer-readable storage medium (e.g., may be transitory or non-transitory). The storage medium stores a computer program, and the computer program indicates a terminal to perform any image processing method provided in the embodiments of this application. The storage medium may include any medium that can store program code, such as a read-only memory (ROM), a random-access memory (RAM), a magnetic disk, or an optical disc.

An embodiment of this application further provides a computer program product including instructions. When the computer program product is run on a computer, the computer is enabled to perform the image processing method provided in the embodiments of this application. The computer program product may include one or more computer instructions. When the computer program instruction is loaded and executed on the computer, all or some of the procedures or functions according to the embodiments of this application are generated. The computer may be a general-purpose computer, a dedicated computer, a computer network, or another programmable apparatus. The computer instruction may be stored in a computer readable storage medium, or may be transmitted by using the computer readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium(for example, a DVD), a semiconductor medium (for example, a solid-state drive (SSD)), or the like.

An embodiment of this application further provides a chip, for example, a CPU chip. The chip includes one or more physical cores and a storage medium. After reading computer instructions in the storage medium, the one or more physical cores implement the foregoing image processing method. In some other embodiments, the chip may implement the foregoing image processing method by using only hardware or a combination of software and hardware. In other words, the chip may include a logic circuit. When the chip runs, the logic circuit is configured to implement any image processing method in the first aspect. The logic circuit may be a programmable logic circuit (PLC). Similarly, a GPU may also be implemented in a manner in which a CPU is implemented.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

In the embodiments of this application, "for A, refer to B" means that A is the same as B or A is simply transformed from B.

The foregoing descriptions are only optional embodiments of this application, but are not intended to limit this application. Any modification, equivalent replacement, improvement, or the like made without departing from the spirit and principle of this application shall fall within the protection scope of this application.

What is claimed is:

1. An image processing method, wherein the method comprises:
    obtaining an inter-frame residual between a first image and a previous image frame adjacent to the first image to obtain a residual block, wherein the residual block comprises a plurality of residual points that are in a one-to-one correspondence with locations of a plurality of pixels in the first image, and each residual point has one residual value;
    determining a first target pixel region in the first image based on the residual block;
    performing super-resolution processing on the first target pixel region in the first image to obtain a second target pixel region after the super-resolution processing; and
    updating a first pixel region in the first image by using a second pixel region that is in the previous image frame and that is obtained after super-resolution processing, wherein
    the first pixel region comprises a pixel region in the first image other than the first target pixel region, and
    the first image obtained after super-resolution processing comprises the second target pixel region obtained after the super-resolution processing and the updated first pixel region.

2. The method according to claim 1, wherein the determining of the first target pixel region in the first image based on the residual block comprises:
    generating a mask pattern based on the residual block, wherein the mask pattern comprises a plurality of first mask points, and the plurality of first mask points are in a one-to-one correspondence with locations of a plurality of target residual points in the residual block; and
    inputting the mask pattern and the first image into a super-resolution model, and determining, as the first target pixel region by using the super-resolution model, a region that is in the first image and in which pixels corresponding to locations of all of the plurality of first mask points are located.

3. The method according to claim 2, wherein the performing of the super-resolution processing on the first target pixel region in the first image to obtain the second target pixel region after the super-resolution processing comprises:
    performing the super-resolution processing on the first target pixel region in the first image by using the super-resolution model, to obtain the second target pixel region after the super-resolution processing.

4. The method according to claim 2, wherein the generating of the mask pattern based on the residual block comprises:
    generating, based on the residual block, an initial mask pattern comprising a plurality of mask points, wherein the plurality of mask points are in a one-to-one correspondence with locations of the plurality of pixels in the first image, and the plurality of mask points comprise the plurality of first mask points and a plurality of second mask points; and
    assigning a first value to a mask value of a first mask point in the initial mask pattern, and assigning a second value to a mask value of a second mask point in the mask pattern, to obtain the mask pattern, wherein the first value is different from the second value; and
    the determining, as the first target pixel region, the pixels that are in the first image and that correspond to the locations of the plurality of first mask points comprises:
    traversing mask points in the mask pattern, and determining, in the first image, a pixel corresponding to a mask point whose mask value is the first value as the first target pixel region.

5. The method according to claim 2, wherein the generating of the mask pattern based on the residual block comprises:
    performing morphological transformation processing on the residual block to obtain the mask pattern, wherein the morphological transformation processing comprises binarization processing and dilation processing that are performed on a first mask point in a residual block obtained after the binarization, the super-resolution model comprises at least one convolutional layer, and a kernel for the dilation processing has a same size as a receptive field of the last convolutional layer of the super-resolution model.

6. The method according to claim 2, wherein the generating of the mask pattern based on the residual block comprises:
    dividing the residual block into a plurality of residual sub-blocks, and performing block division processing on each residual sub-block obtained through the division, wherein the block division processing comprises:
    when a residual value of at least one residual point comprised in the residual sub-block is not 0, dividing the residual sub-block into a plurality of residual sub-blocks, and performing block division processing on each residual sub-block obtained through the division, until residual values of all residual points comprised in a residual sub-block obtained through the division are 0, a total quantity of residual points in a residual sub-block obtained through the division is less than a point quantity threshold, or a total quantity of times for dividing the residual block reaches a quantity of times threshold; and
    generating a mask sub-pattern corresponding to each target residual block, wherein a residual value of at least one residual point comprised in the target residual block is not 0, and
    the mask pattern comprises the generated mask sub-pattern.

7. The method according to claim 6, wherein the performing super-resolution processing on the first target pixel region in the first image to obtain the second target pixel region after the super-resolution processing comprises:
    obtaining, from the first image, a target image block corresponding to each of the mask sub-patterns; and
    performing super-resolution processing on a sub-region that is of the first target pixel region and that is comprised in each of the target image blocks, to obtain the second target pixel region after the super-resolution processing, wherein the second target pixel region obtained after the super-resolution processing comprises sub-regions of the first target pixel region that are comprised in all the target image blocks and that are obtained after the super-resolution processing.

8. The method according to claim 1, wherein the determining of the target pixel region in the first image based on the residual block comprises:
generating a mask pattern based on the residual block, wherein the mask pattern comprises a plurality of first mask points, and the plurality of first mask points are in a one-to-one correspondence with locations of a plurality of target residual points in the residual block; and
determining, as the first target pixel region, a region that is in the first image and in which pixels corresponding to locations of all of the plurality of first mask points are located.

9. The method according to claim 8, wherein the performing of the super-resolution processing on the first target pixel region in the first image to obtain the second target pixel region after the super-resolution processing comprises:
inputting the first target pixel region in the first image into a super-resolution model, and performing the super-resolution processing on the first target pixel region in the first image by using the super-resolution model, to obtain the second target pixel region after the super-resolution processing.

10. An image processing apparatus, comprising a memory and a processor, wherein the memory is configured to store a computer program, and the processor is configured to invoke the computer program from the memory and run the computer program to perform an image processing method, the method comprising:
obtaining an inter-frame residual between a first image and a previous image frame adjacent to the first image to obtain a residual block, wherein the residual block comprises a plurality of residual points that are in a one-to-one correspondence with locations of a plurality of pixels in the first image, and each residual point has one residual value;
determining a first target pixel region in the first image based on the residual block;
performing super-resolution processing on the first target pixel region in the first image to obtain a second target pixel region after the super-resolution processing; and
updating a first pixel region in the first image by using a second pixel region that is in the previous image frame and that is obtained after super-resolution processing, wherein the first pixel region comprises a pixel region in the first image other than the first target pixel region, and
the first image obtained after super-resolution processing comprises the second target pixel region obtained after the super-resolution processing and the updated first pixel region.

11. The apparatus according to claim 10, wherein the determining of the first target pixel region in the first image based on the residual block comprises:
generating a mask pattern based on the residual block, wherein the mask pattern comprises a plurality of first mask points, and the plurality of first mask points are in a one-to-one correspondence with locations of a plurality of target residual points in the residual block; and
inputting the mask pattern and the first image into a super-resolution model, and determining, as the first target pixel region by using the super-resolution model, a region that is in the first image and in which pixels corresponding to locations of all of the plurality of first mask points are located.

12. The apparatus according to claim 11, wherein the performing of the super-resolution processing on the first target pixel region in the first image to obtain the second target pixel region after the super-resolution processing comprises:
performing the super-resolution processing on the first target pixel region in the first image by using the super-resolution model, to obtain the second target pixel region after the super-resolution processing.

13. The apparatus according to claim 11, wherein the generating of the mask pattern based on the residual block comprises:
generating, based on the residual block, an initial mask pattern comprising a plurality of mask points, wherein the plurality of mask points are in a one-to-one correspondence with locations of the plurality of pixels in the first image, and the plurality of mask points comprise the plurality of first mask points and a plurality of second mask points; and
assigning a first value to a mask value of a first mask point in the initial mask pattern, and assigning a second value to a mask value of a second mask point in the mask pattern, to obtain the mask pattern, wherein the first value is different from the second value; and
the determining, as the first target pixel region, the pixels that are in the first image and that correspond to the locations of the plurality of first mask points comprises:
traversing mask points in the mask pattern, and determining, in the first image, a pixel corresponding to a mask point whose mask value is the first value as the first target pixel region.

14. The apparatus according to claim 11, wherein the generating of the mask pattern based on the residual block comprises:
performing morphological transformation processing on the residual block to obtain the mask pattern, wherein the morphological transformation processing comprises binarization processing and dilation processing that are performed on a first mask point in a residual block obtained after the binarization, the super-resolution model comprises at least one convolutional layer, and a kernel for the dilation processing has a same size as a receptive field of the last convolutional layer of the super-resolution model.

15. The apparatus according to claim 11,
wherein the generating of the mask pattern based on the residual block comprises:
dividing the residual block into a plurality of residual sub-blocks, and performing block division processing on each residual sub-block obtained through the division, wherein the block division processing comprises:
when a residual value of at least one residual point comprised in the residual sub-block is not 0, dividing the residual sub-block into a plurality of residual sub-blocks, and performing block division processing on each residual sub-block obtained through the division, until residual values of all residual points comprised in a residual sub-block obtained through the division are 0, a total quantity of residual points in a residual sub-block obtained through the division is less than a point quantity threshold, or a total quantity of times for dividing the residual block reaches a quantity of times threshold; and
generating a mask sub-pattern corresponding to each target residual block, wherein a residual value of at least one residual point comprised in the target residual block is not 0, and the mask pattern comprises the generated mask sub-pattern.

16. The apparatus according to claim 15, wherein the performing of the super-resolution processing on the first target pixel region in the first image to obtain the second target pixel region after the super-resolution processing comprises:

obtaining, from the first image, a target image block corresponding to each of the mask sub-patterns; and performing super-resolution processing on a sub-region that is of the first target pixel region and that is comprised in each of the target image blocks, to obtain the second target pixel region after the super-resolution processing, wherein the second target pixel region obtained after the super-resolution processing comprises sub-regions of the first target pixel region that are comprised in all the target image blocks and that are obtained after the super-resolution processing.

17. The apparatus according to claim 10, wherein the determining of the target pixel region in the first image based on the residual block comprises:

generating a mask pattern based on the residual block, wherein the mask pattern comprises a plurality of first mask points, and the plurality of first mask points are in a one-to-one correspondence with locations of a plurality of target residual points in the residual block; and determining, as the first target pixel region, a region that is in the first image and in which pixels corresponding to locations of all of the plurality of first mask points are located.

18. The apparatus according to claim 10, wherein the performing of the super-resolution processing on the first target pixel region in the first image to obtain the second target pixel region after the super-resolution processing comprises:

inputting the first target pixel region in the first image into a super-resolution model, and performing the super-resolution processing on the first target pixel region in the first image by using the super-resolution model, to obtain the second target pixel region after the super-resolution processing.

19. An electronic device, comprising a processor and a memory, wherein the memory is configured to store a computer program; and when the processor executes the computer program stored in the memory, causes the processor to perform an image processing method comprising:

obtaining an inter-frame residual between a first image and a previous image frame adjacent to the first image to obtain a residual block, wherein the residual block comprises a plurality of residual points that are in a one-to-one correspondence with locations of a plurality of pixels in the first image, and each residual point has one residual value;

determining a first target pixel region in the first image based on the residual block;

performing super-resolution processing on the first target pixel region in the first image to obtain a second target pixel region after the super-resolution processing; and updating a first pixel region in the first image by using a second pixel region that is in the previous image frame and that is obtained after super-resolution processing, wherein the first pixel region comprises a pixel region in the first image other than the first target pixel region, and the first image obtained after super-resolution processing comprises the second target pixel region obtained after the super-resolution processing and the updated first pixel region.

20. The electronic device according to claim 19, wherein the determining of the first target pixel region in the first image based on the residual block comprises:

generating a mask pattern based on the residual block, wherein the mask pattern comprises a plurality of first mask points, and the plurality of first mask points are in a one-to-one correspondence with locations of a plurality of target residual points in the residual block; and inputting the mask pattern and the first image into a super-resolution model, and determining, as the first target pixel region by using the super-resolution model, a region that is in the first image and in which pixels corresponding to locations of all of the plurality of first mask points are located.

* * * * *